United States Patent
Hirobe et al.

(10) Patent No.: US 11,474,756 B2
(45) Date of Patent: Oct. 18, 2022

(54) INFORMATION PROCESSING APPARATUS CAPABLE OF ALLOWING DISPLAY DEVICE TO DISPLAY COMBINATIONS OF SETTING VALUES PREVIOUSLY SET FOR EACH OF PLURALITY OF FUNCTIONS

(71) Applicant: KYOCERA Document Solutions Inc., Osaka (JP)

(72) Inventors: Yumi Hirobe, Osaka (JP); Takashi Namii, Osaka (JP); Yoichi Hiranuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/228,493

(22) Filed: Apr. 12, 2021

(65) Prior Publication Data
US 2021/0326079 A1 Oct. 21, 2021

(30) Foreign Application Priority Data
Apr. 21, 2020 (JP) .............................. JP2020-075360
Apr. 21, 2020 (JP) .............................. JP2020-075361

(51) Int. Cl.
*G06F 3/12* (2006.01)
*H04N 1/44* (2006.01)

(52) U.S. Cl.
CPC .......... *G06F 3/1204* (2013.01); *G06F 3/1273* (2013.01); *G06F 3/1279* (2013.01); *H04N 1/4413* (2013.01)

(58) Field of Classification Search
CPC .... G06F 3/1204; G06F 3/1279; G06F 3/1273; H04N 1/4413

USPC ......................................................... 358/1.15
See application file for complete search history.

(56) References Cited

U.S. PATENT DOCUMENTS

| | | | |
|---|---|---|---|
| 2013/0050731 A1* | 2/2013 | Fukuoh | H04N 1/00482 358/1.13 |
| 2015/0222770 A1* | 8/2015 | Yoshida | H04N 1/00506 358/1.15 |
| 2018/0220015 A1* | 8/2018 | Akuzawa | H04N 1/00389 |
| 2019/0379799 A1* | 12/2019 | Shogaki | H04N 1/00411 |

FOREIGN PATENT DOCUMENTS

| | | |
|---|---|---|
| JP | 2018-125686 A | 8/2018 |
| JP | 2019-119139 A | 7/2019 |

* cited by examiner

*Primary Examiner* — Neil R McLean
(74) *Attorney, Agent, or Firm* — IP Business Solutions, LLC

(57) ABSTRACT

In an information processing apparatus, a storage device stores a plurality of respective combinations of setting values set in jobs previously executed in relation to each of a plurality of predetermined functions, and a control device allows a display device to display at least one of respective first images representing the plurality of functions in a first region of a display area and display, in a second region of the display area, at least one of respective second images showing the plurality of combinations of setting values stored in the storage device and, upon acceptance of a touch gesture on one of the at least one second image through a touch panel of an operation device, executes, in accordance with the combination of setting values shown by the second image on which the touch gesture has been made, a job related to the function associated with the second image.

13 Claims, 29 Drawing Sheets

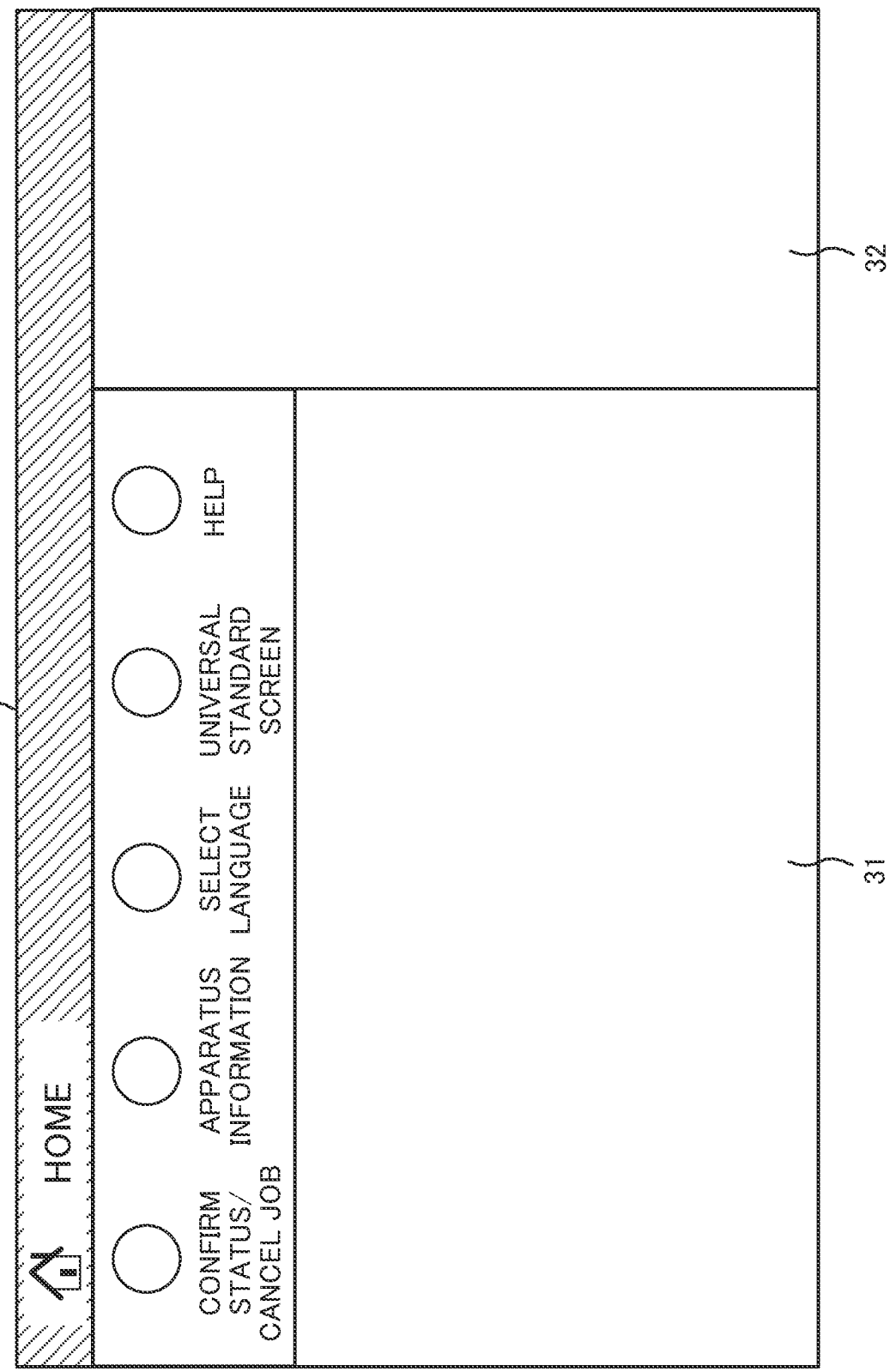

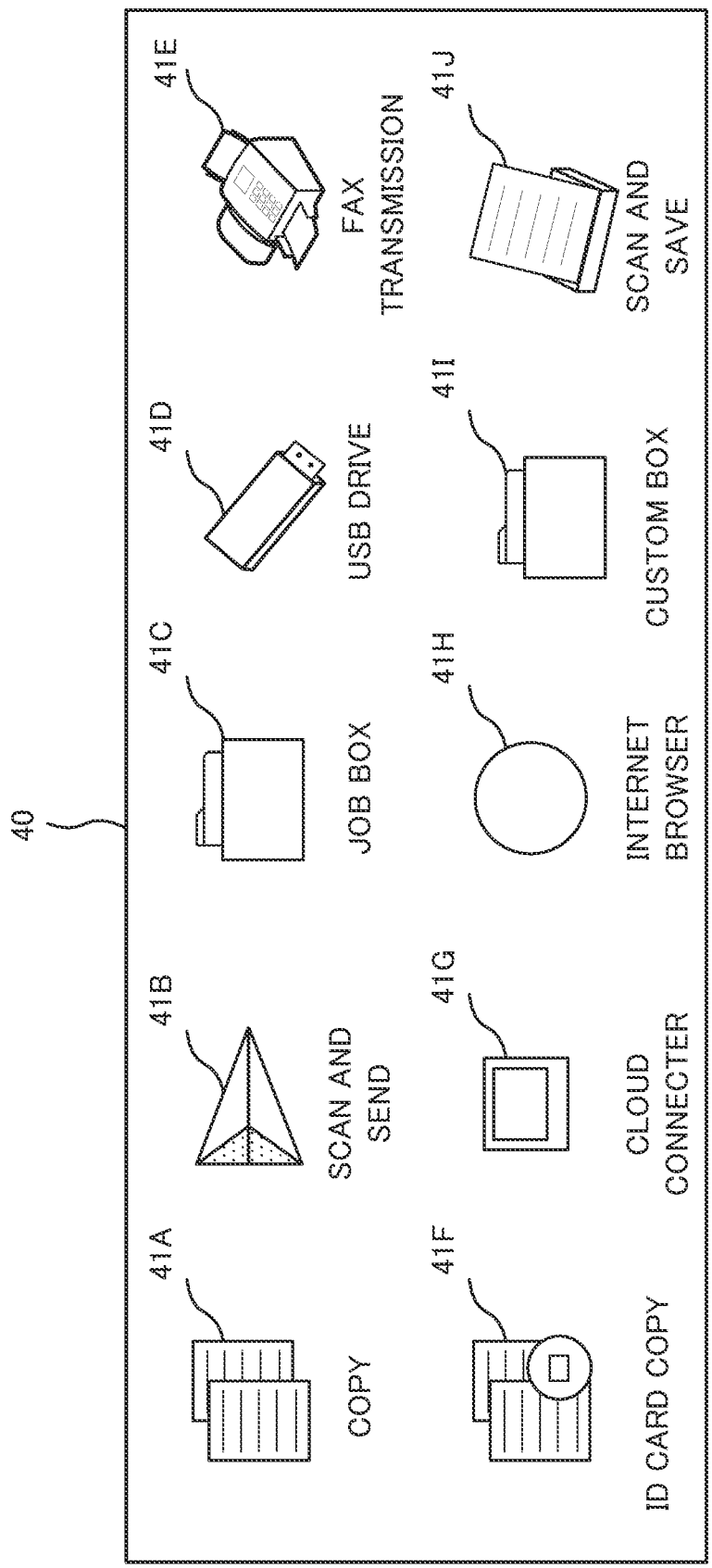

Fig.5A

| DATE | COPIES | SETTINGS ||||| |
| --- | --- | --- | --- | --- | --- | --- |
| | | SHEET | MAG. | COLOR | AGGR. | ... |
| 2020/01/01 13:00:05 | 3 | AUTO | 100% | FULL | 1 IN 1 | ... |
| 2020/01/01 15:40:07 | 1 | A4 | 70% | B&W | 2 IN 1 | ... |
| 2020/01/01 17:53:02 | 4 | A3 | 100% | FULL | 1 IN 1 | ... |

| DATE | DESTN. | SETTINGS | | |
|---|---|---|---|---|
| | | ADDRESS | | ⋮ |
| 2020/01/01 10:03:05 | ADAM | ABCD.EFG@COM | | ⋮ |
| 2020/01/01 14:40:09 | JOHN | HIJK.LMN@COM | | ⋮ |

| DATE | DESTN. | SETTINGS | |
| --- | --- | --- | --- |
| | | FAX NO. | ... |
| 2020/01/01 14:00:07 | LEO | 01-2345-6789 | ... |

| DATE | SETTINGS | | |
| --- | --- | --- | --- |
| | DESTN. TO SAVE | FORMAT | ... |
| 2020/01/01 17:03:05 | PQR¥STU | PDF | ... |

53A

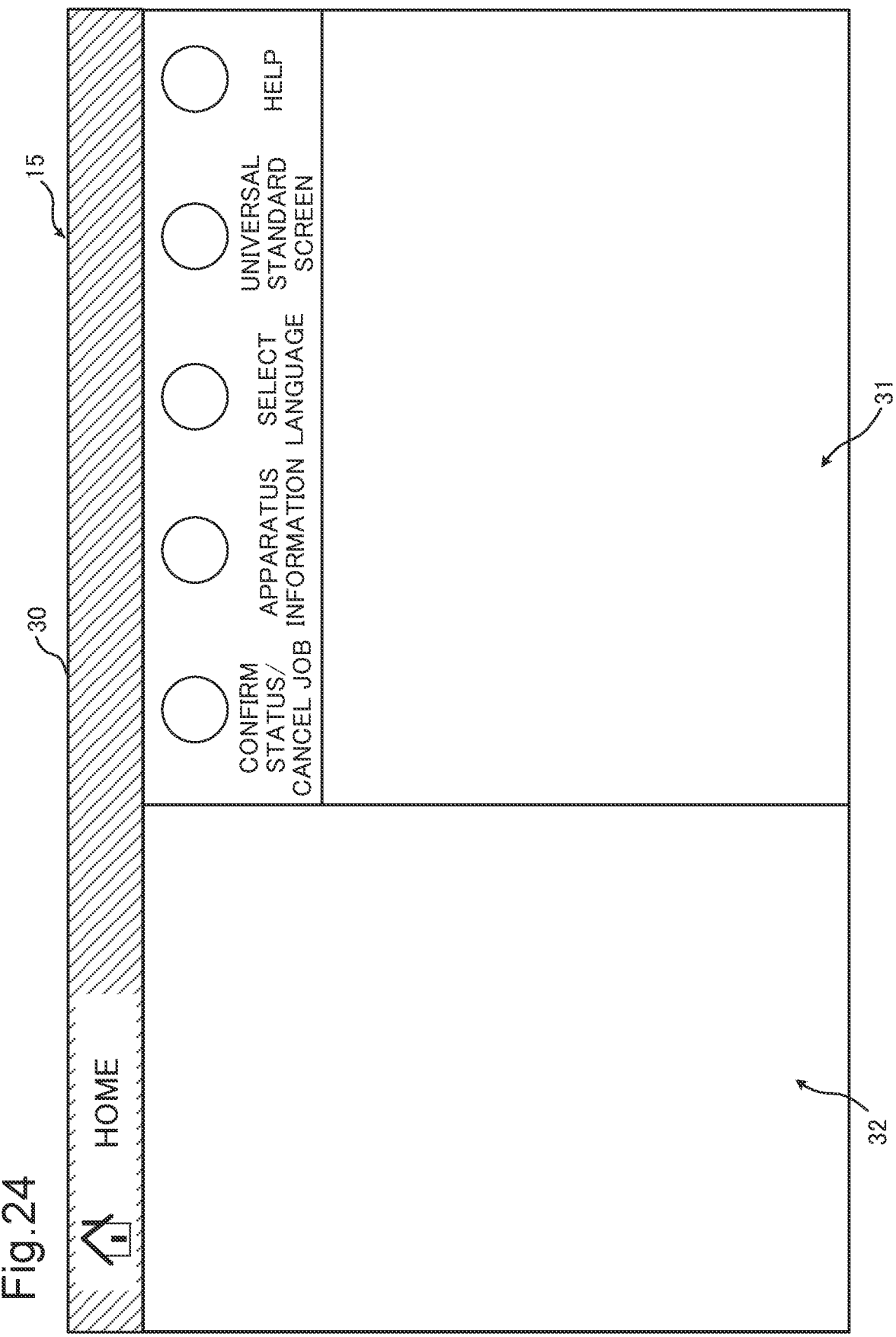

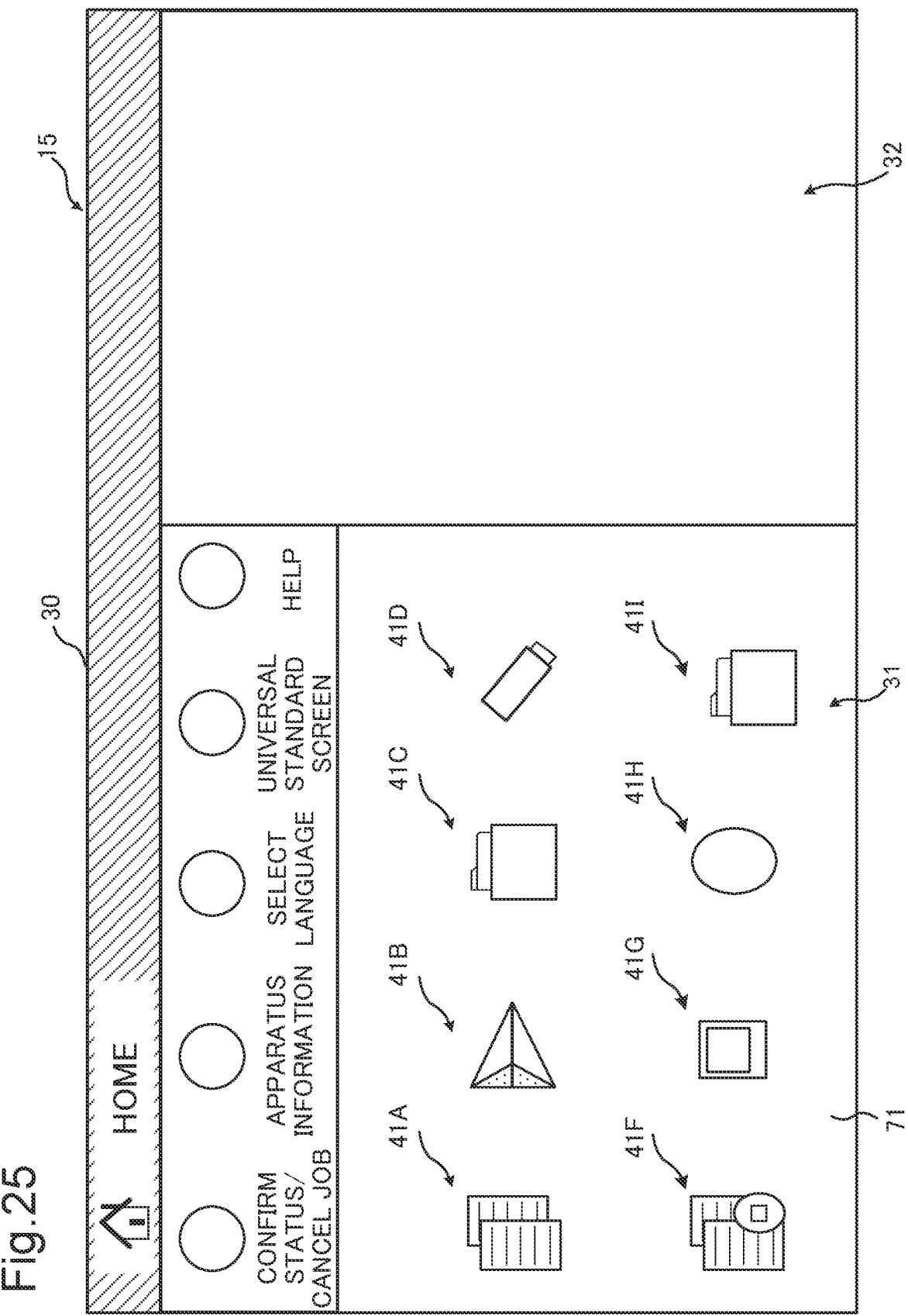

INFORMATION PROCESSING APPARATUS CAPABLE OF ALLOWING DISPLAY DEVICE TO DISPLAY COMBINATIONS OF SETTING VALUES PREVIOUSLY SET FOR EACH OF PLURALITY OF FUNCTIONS

INCORPORATION BY REFERENCE

This application claims priority to Japanese Patent Application No. 2020-075360 filed on 21 Apr. 2020 and Japanese Patent Application No. 2020-075361 filed on 21 Apr. 2020, the entire contents of which are incorporated by reference herein.

BACKGROUND

The present disclosure relates to information processing apparatuses and particularly relates to a technique for applying a combination of setting values set in a previously executed job to the next job.

There is known a technique for applying a combination of setting values set in a previously executed job to the next job. For example, a general technique is known in which respective application buttons representing a plurality of functions executable on an image forming apparatus are displayed in a predetermined region of a home screen, history buttons showing combinations of setting values set in previously executed jobs are displayed in another predetermined region of the home screen, and one of the combinations of setting values shown by the history buttons is accepted as values for use in the next job.

SUMMARY

A technique improved over the aforementioned technique is proposed as one aspect of the present disclosure.

An information processing apparatus according to an aspect of the present disclosure includes a display device, an operation device, a storage device, and a control device. The display device includes a display area. The operation device includes a touch panel provided on the display device and accepts an instruction from a user. The storage device stores a plurality of respective combinations of setting values set in jobs previously executed in relation to each of a plurality of predetermined functions. The control device includes a processor and functions as a controller through the processor executing a control program. The controller allows the display device to display at least one of a plurality of respective first images representing the plurality of functions in a predetermined first region of the display area and display, in a predetermined second region of the display area different from the first region, at least one of respective second images showing the plurality of combinations of setting values stored in the storage device, and, upon acceptance of a touch gesture on one of the at least one second image through the touch panel, the controller executes, in accordance with the combination of setting values shown by the second image on which the touch gesture has been made, a job related to the function associated with the second image.

BRIEF DESCRIPTION OF THE DRAWINGS

FIG. 3 is a view showing an example of a home screen.

FIG. 4 is a view showing an example of a scrollable menu image for use in being displayed in a first region.

FIG. 5A is a view showing examples of combinations of setting values.

FIG. 5B is a view showing other examples of combinations of setting values.

FIG. 5C is a view showing still another example of a combination of setting values.

FIG. 5D is a view showing still another example of a combination of setting values.

FIG. 24 is a view showing a state of a home screen where the location of the second region has been changed.

FIG. 25 is a view showing an example of a state where icons are displayed in a simplified manner.

DETAILED DESCRIPTION

First Embodiment

Figure 1:
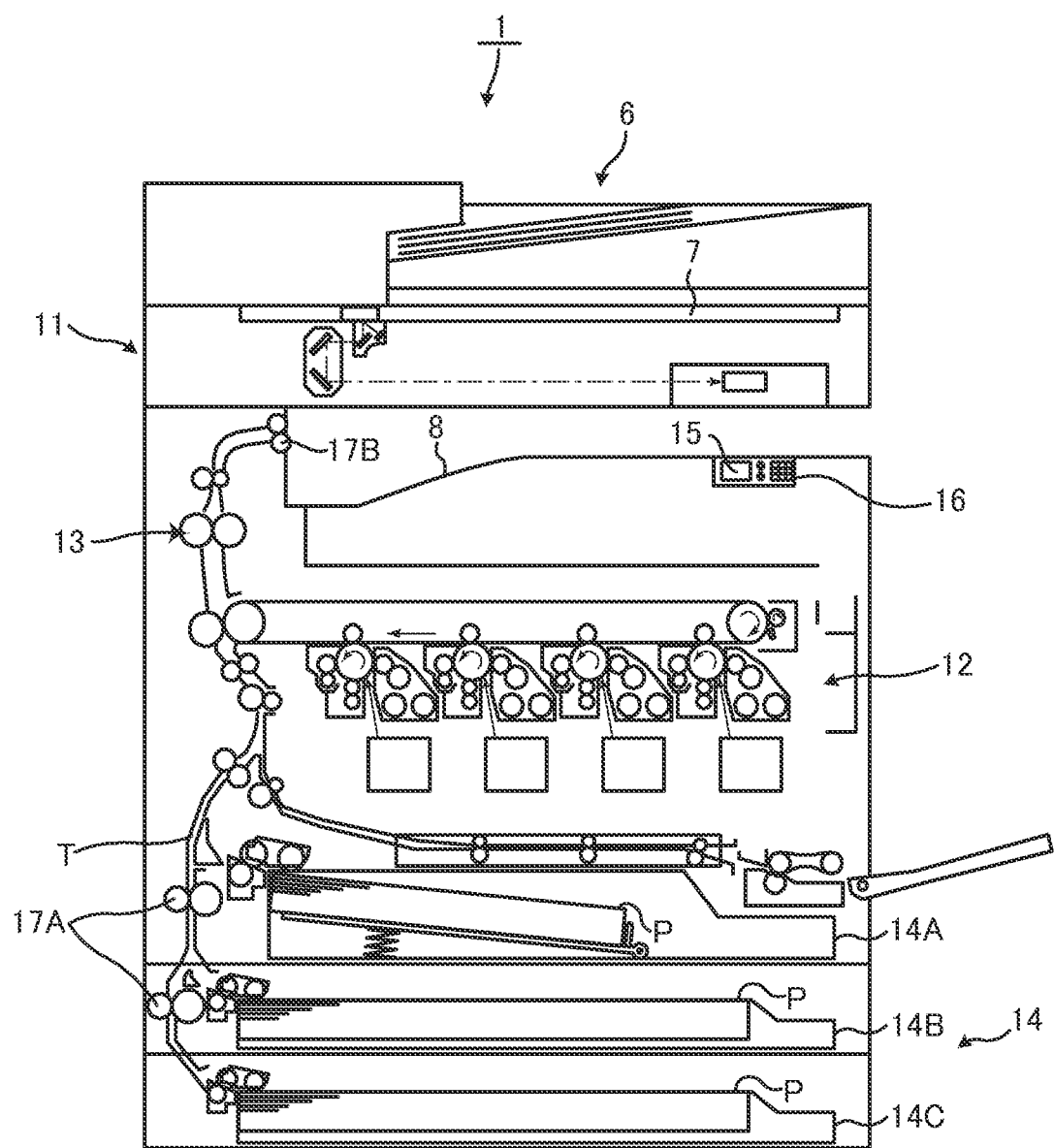
FIG. 1 is a frontal cross-sectional view showing the structure of an image forming apparatus according to one embodiment of the present disclosure.
Figure 2:
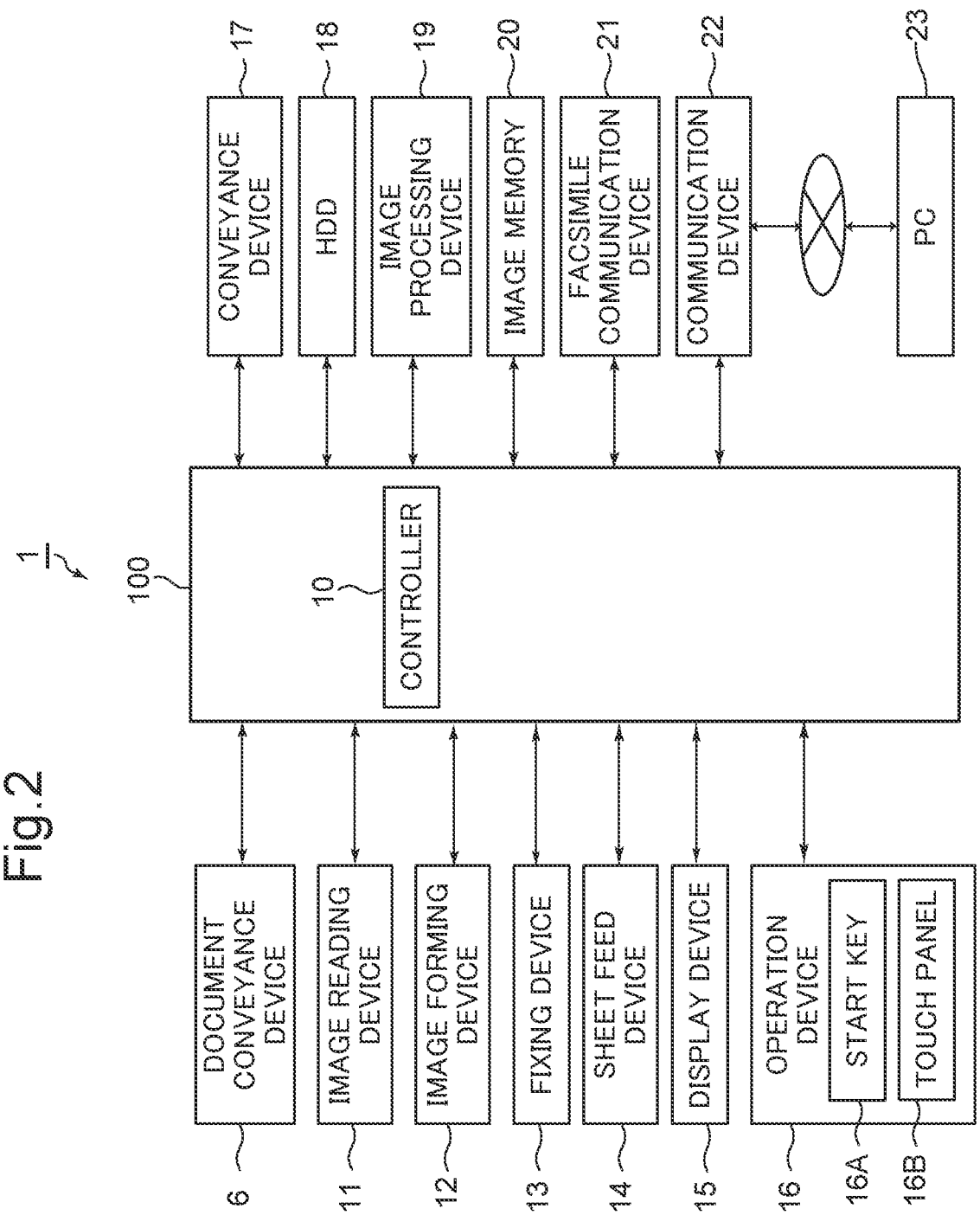
FIG. 2 is a block diagram showing an internal configuration of the image forming apparatus.

Hereinafter, a description will be given of an image forming apparatus as an information processing apparatus according to a first embodiment of the present disclosure with reference to the drawings. FIG. 1 is a frontal cross-sectional view showing the structure of an image forming apparatus according to the first embodiment of the present disclosure. FIG. 2 is a block diagram showing an internal configuration of the image forming apparatus. Referring to FIGS. 1 and 2, the image forming apparatus 1 is a multicolor multifunction peripheral configured so that jobs related to each of a plurality of predetermined functions can be executed.

The plurality of predetermined functions described above include, but are not limited to, in this embodiment, a copy function, a scan and send function, a job box function, a USB (universal serial bus) drive function, a facsimile transmission function, an ID (identification) card copy function, a cloud connector function, an Internet browser function, a custom box function, and a scan and save function.

A housing of the image forming apparatus 1 contains a plurality of devices for use in implementing various functions of the image forming apparatus 1. The housing contains, for example, an image reading device 11, an image forming device 12, a fixing device 13, a sheet feed device 14, and so on.

The image forming apparatus 1 includes a control device 100. The control device 100 includes a processor, a RAM (random access memory), a ROM (read only memory), and so on. The processor is, for example, a CPU (central processing unit), an MPU (micro processing unit), an ASIC (application specific integrated circuit) or the like.

When a control program stored in the ROM or an HDD 18 is executed by the above processor, the control device 100 functions as a controller 10. Alternatively, the controller 10 may not be implemented by the operation of the processor in accordance with the above control program, but may be constituted by a logic circuit.

The controller 10 governs the overall operation control of the image forming apparatus 1. More specifically, the controller 10 controls the operations of the devices constituting the image forming apparatus 1 and communications with a PC (personal computer) 23 and other external devices connected via a network. Furthermore, by operating in accordance with a first program described hereinafter, the controller 10 executes, upon acceptance of a specification instruction to specify the size of icons, first history button display processing for allowing a display device 15 to display the icons in the specified size in a first region of a home screen and display history buttons in a size according to the specified size of the icons in a second region of the home screen.

The control device 100 is electrically connected to a document conveyance device 6, the image reading device 11, the image forming device 12, the fixing device 13, the sheet feed device 14, the display device 15, an operation device 16, a conveyance device 17, the HDD 18, an image processing device 19, an image memory 20, a facsimile communication device 21, a communication device 22, and so on.

The image reading device 11 is an ADF (auto document feeder) including: a document conveyance device 6 that conveys an original document placed on a document loading table; and a scanner that optically reading an original document conveyed by the document conveyance device 6 or an original document placed on a platen glass 7. The image reading device 11 irradiates the original document with light from a lighting part, receives light reflected from the original document on a CCD (charge-coupled device) sensor to read an image of the original document, and thus generates image data representing the image of the original document.

The image forming device 12 includes a plurality of photosensitive drums, charging devices, exposure devices, developing devices, and transfer devices, each provided for a corresponding one of different color toners. The image forming device 12 forms an image consisting of a toner image on a recording paper sheet P being conveyed along a conveyance path T by the conveyance device 17, based on the image data generated by the image reading device 11 or image data or the like input through the communication device 22.

The fixing device 13 applies heat and pressure to the recording paper sheet P having the toner image formed thereon by the image forming device 12, thus fixing the toner image on the recording paper sheet P. The recording paper sheet P having the toner image fixed thereon by the fixing device 13 is discharged to a sheet output tray 8.

The sheet feed device 14 includes a manual feed tray, a first sheet feed cassette 14A, a second sheet feed cassette 14B, and a third sheet feed cassette 14C. The sheet feed device 14 pulls out recording paper sheets P contained in the first sheet feed cassette 14A, the second sheet feed cassette 14B or the third sheet feed cassette 14C or recording paper sheets placed on the manual feed tray, sheet by sheet, with a pick-up roller and feeds forward the pulled-out recording paper sheet to the conveyance path T.

The display device 15 is a display device composed of a liquid crystal display, an organic EL (an organic light-emitting diode) display or the like. The display device 15 displays, under the control of the controller 10, various screen images related to various functions executable by the image forming apparatus 1.

The operation device 16 includes a plurality of hard keys, such as a Start key 16A for instructing the start of execution of various types of processing. The operation device 16 further includes a touch panel 16B superposed on the top of the display device 15. Thus, the user can input through the operation device 16 various information, including instructions for various functions executable by the image forming apparatus 1.

The conveyance device 17 includes: rollers including conveyance roller pairs 17A and an ejection roller pair 17B; and a conveyance motor electrically connected to the conveyance roller pairs 17A and the ejection roller pair 17B. The rollers including the conveyance roller pairs 17A and the ejection roller pair 17B are disposed along the conveyance path T. The controller 10 drives the conveyance motor to rotate the conveyance roller pairs 17A and the ejection roller pair 17B, thus allowing the rollers to convey the recording paper sheet P, which has been fed by the sheet feed device 14, toward the image forming device 12 and the sheet output tray 8 along the conveyance path T.

The HDD 18 is a large storage device for use in storing various types of data, including image data generated by the image reading device 11. The HDD 18 is an example of the storage device defined in CLAIMS. The HDD 18 stores various control programs for implementing general operations of the image forming apparatus 1. The HDD 18 holds, as one of the various control programs, a first program for executing first history button display processing according to the first embodiment.

The HDD 18 further holds image data representing a default home screen. FIG. 3 is a view showing an example of a home screen. As shown in FIG. 3, the home screen 30 includes a predetermined first region 31 and a predetermined second region 32 different from the first region 31. In this embodiment, the second region 32 is located, by default, at one end of the home screen 30 in the longitudinal direction thereof. The default size ratio between the first region 31 and the second region 32 is "4:1".

The HDD 18 further holds image data representing a scrollable menu image for use in being displayed in the first region 31. FIG. 4 is a view showing an example of a scrollable menu image for use in being displayed in the first region 31. Referring to FIG. 4, the scrollable menu image 40 includes respective icons 41A to 41J representing the above-described plurality of predetermined functions executable on the image forming apparatus 1. The icons 41A to 41J contain respective character strings indicating the respective functions associated with the icons 41A to 41J. For example, the icon 41A contains a character string "COPY" indicating a copy function. The icon 41B contains a character string "SCAN AND SEND" indicating a scan and send function.

In this example, the icons 41A to 41J are arranged in two rows and five columns. Specifically, the icons 41A to 41E are aligned in this order on one side of the scrollable menu image 40 in the widthwise direction thereof and along the longitudinal direction of the scrollable menu image 40. The icons 41F to 41J are aligned in this order on the other side of the scrollable menu image 40 in the widthwise direction thereof and along the longitudinal direction of the scrollable menu image 40. The size of the icons 41A to 41E when the scrollable menu image 40 is neither enlarged nor reduced corresponds to a "small" size which will be described hereinafter.

The HDD 18 further holds a plurality of respective combinations of setting values set in jobs previously executed in relation to each of the above-described plurality of functions executable on the image forming apparatus 1. FIGS. 5A to 5D show examples of combinations of setting values. As shown in FIG. 5A, the HDD 18 holds, in association with the copy function, a combination 50A of setting values set in a copy job executed at 13:00:05 on Jan. 1, 2020 (hereinafter, the statements of the same date will be omitted), a combination 50B of setting values set in a copy job executed at 15:40:07, and a combination 50C of setting values set in a copy job executed at 17:53:02.

As shown in FIG. 5B, the HDD 18 holds, in association with the scan and send function, a combination 51A of setting values set in a scan and send job executed at 10:03:05, and a combination 51B of setting values set in a scan and send job executed at 14:40:09. As shown in FIG. 5C, the HDD 18 holds, in association with the facsimile transmission function, a combination 52A of setting values set in a facsimile transmission job executed at 14:00:07.

As shown in FIG. 5D, the HDD 18 holds, in association with the scan and save function, a combination 53A of setting values set in a scan and save job executed at 17:03:05. In this example, the HDD 18 does not hold any combination of setting values for the job box function, the USB drive function, the ID card copy function, the cloud connector function, the Internet browser function, and the custom box function, because no job related to these functions has been executed previously.

The HDD 18 further holds as first information a plurality of setting combinations, each consisting of a size of the history buttons, a value of the number of icons to be displayed in the first region 31, and a value of the number of history buttons to be displayed in the second region 32, which vary according to the size of the ions. Specifically, the HDD 18 holds, as default settings and in association with a size "small" of the icons, a setting combination of a size "small" of the history buttons, a value "8" of the number of icons, and a value "6" of the number of history buttons. The HDD 18 also holds, in association with a size "large" of the icons, a setting combination of a size "large" of the history buttons, a value "4" of the number of icons, and a value "3" of the number of history buttons. The size "large" used herein refers to a size set to be a predetermined size greater than the size "small". The size "small" of the icons shows an example of the first size defined in CLAIMS. The size "large" of the icons shows an example of the second size defined in CLAIMS.

The image processing device 19 performs, as necessary, image processing of image data generated by the image reading device 11. The image memory 20 includes a region that temporarily stores image data generated by the image reading device 11. The facsimile communication device 21 performs connection to a public line and transfers image data to and from other facsimile devices via the public line.

The communication device 22 includes a communication module, such as a LAN (local area network) board. The image forming apparatus 1 performs data communications through the communication device 22 with external devices, such as the PC 23, connected thereto via the network.

Each of the devices constituting the image forming apparatus 1 is connected to a power supply and operates on electric power supplied from the power supply.

[Operations]

Figure 6:
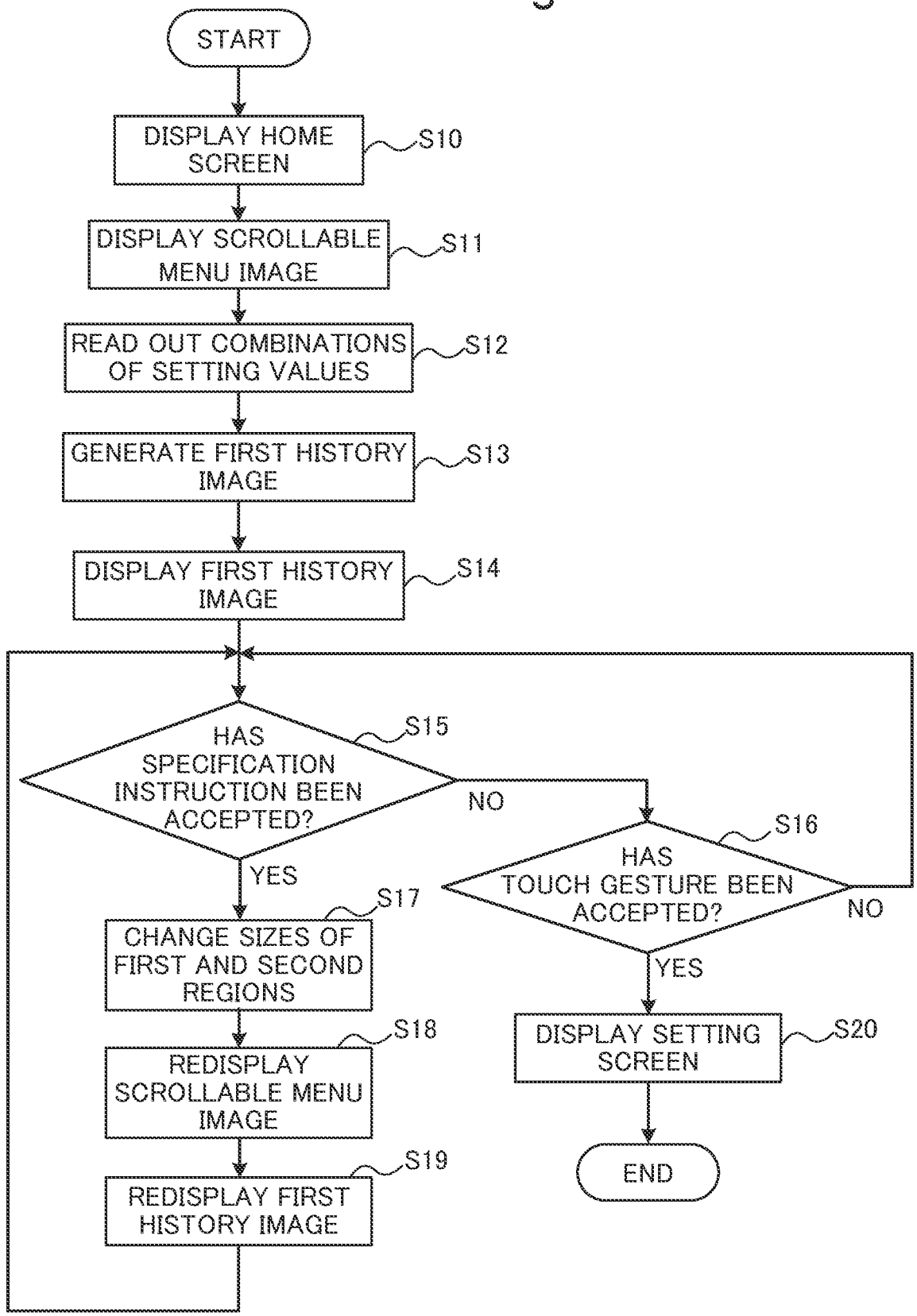
FIG. 6 is a flowchart showing first history button display processing.
Figure 7:
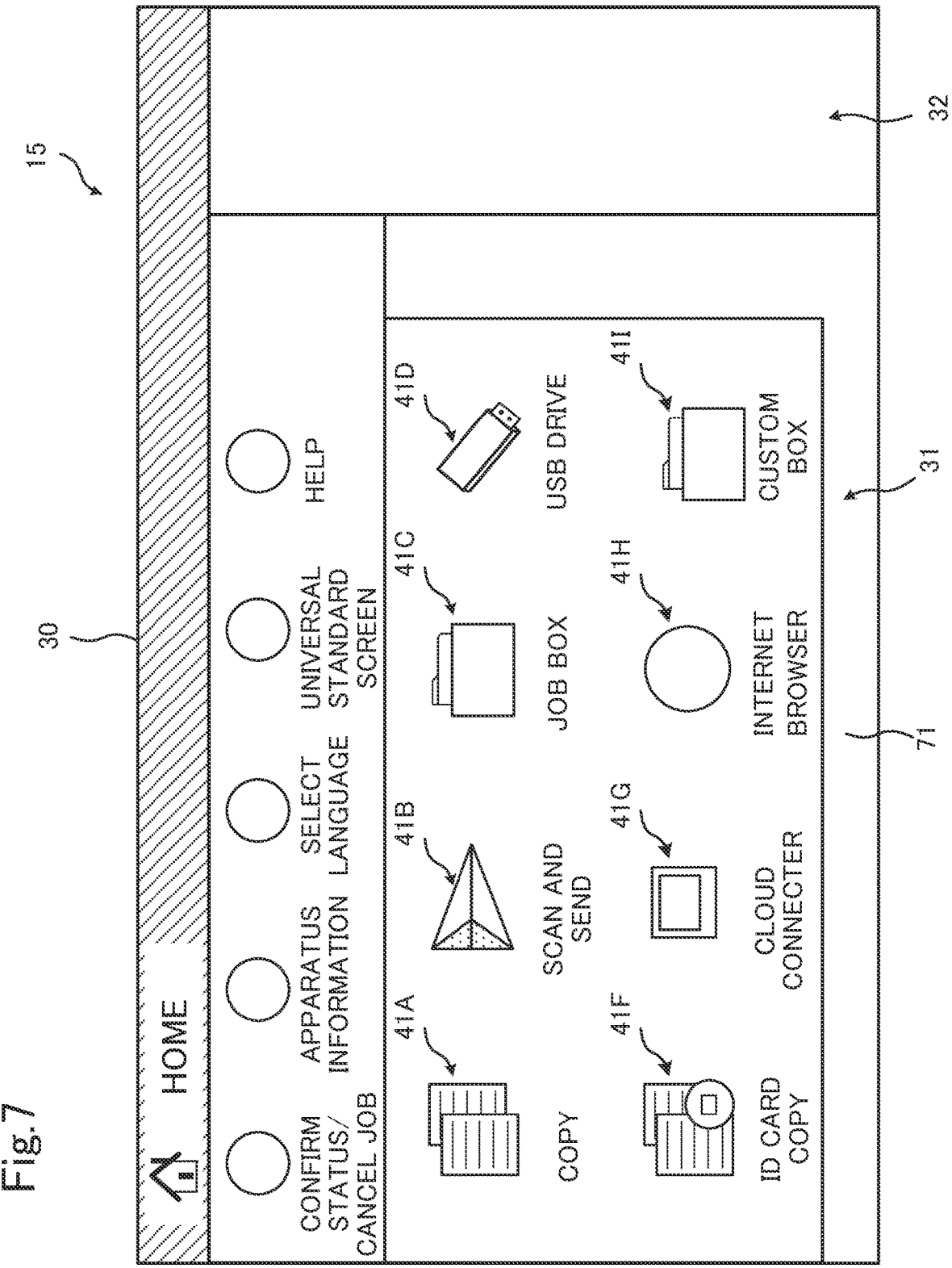
FIG. 7 is a view showing an example of a state where a portion of the scrollable menu image is displayed in the first region.
Figure 8:
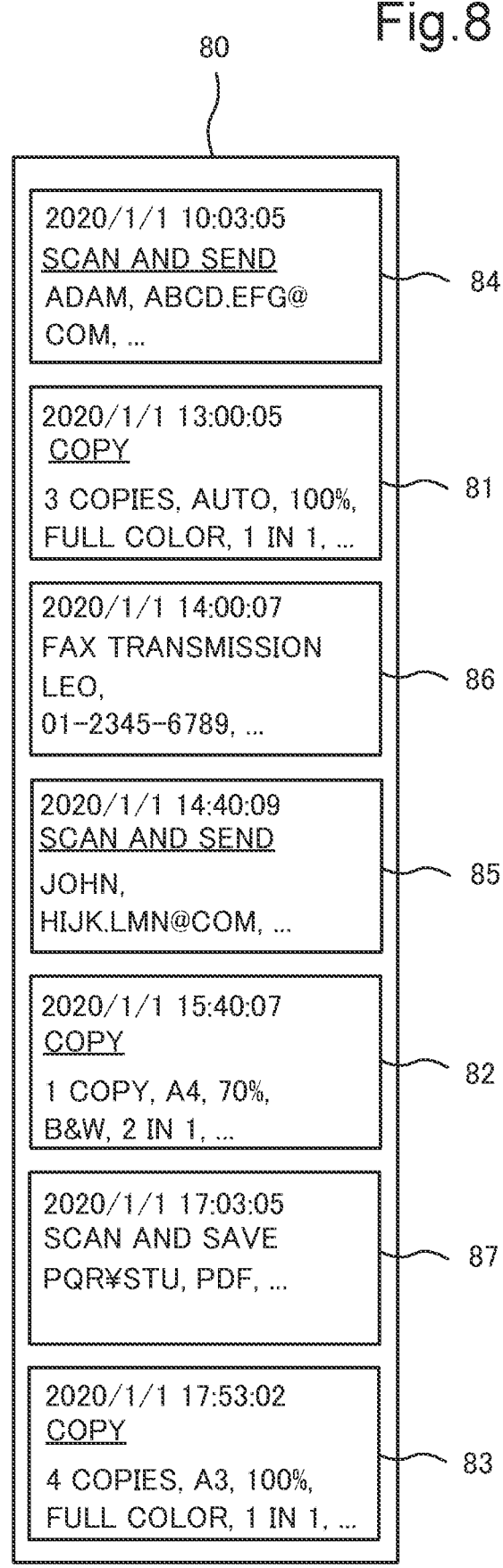
FIG. 8 is a view showing an example of a first history image.
Figure 9:
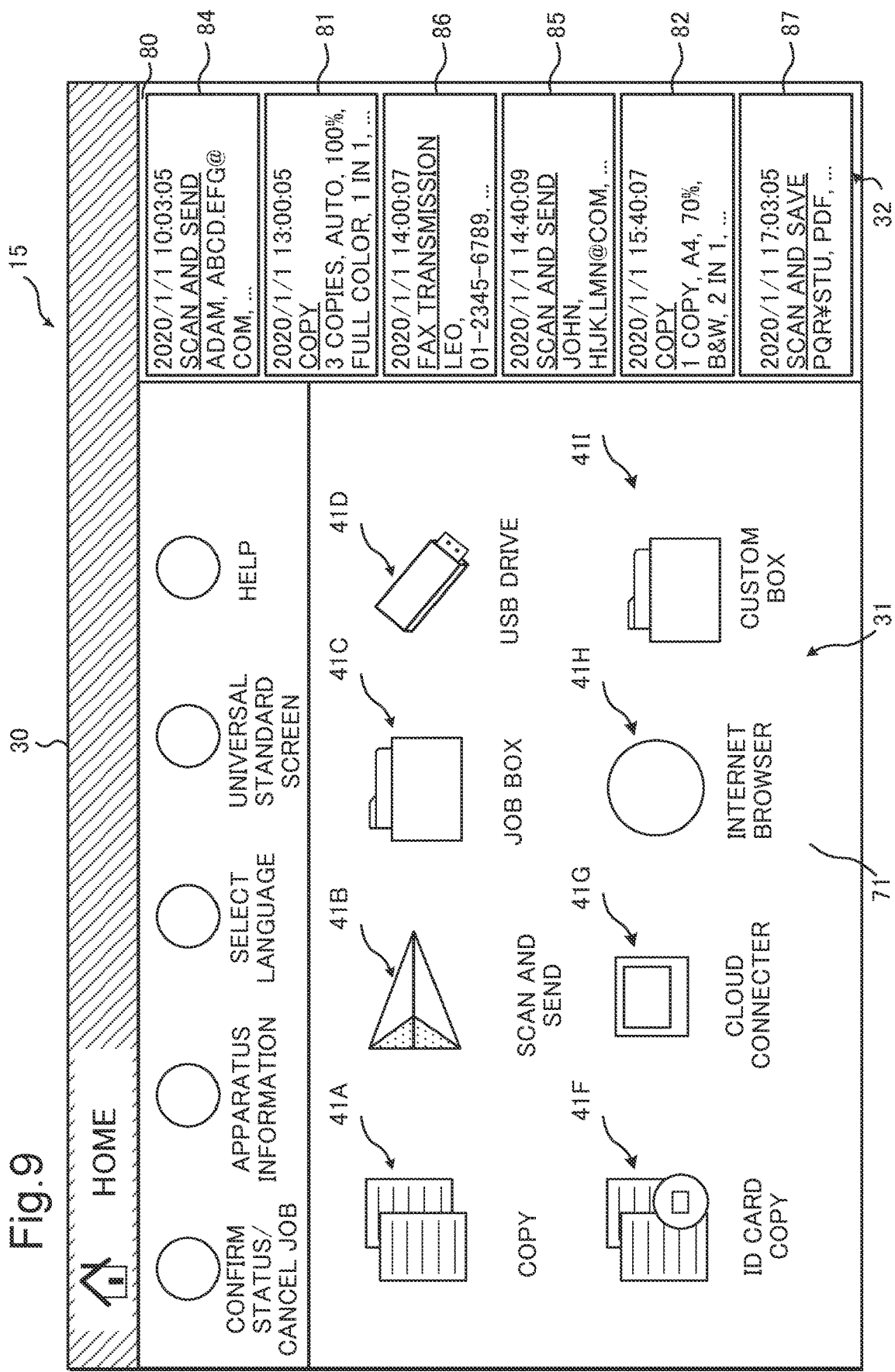
FIG. 9 is a view showing an example of a state where history buttons are displayed in a second region.
Figure 10:
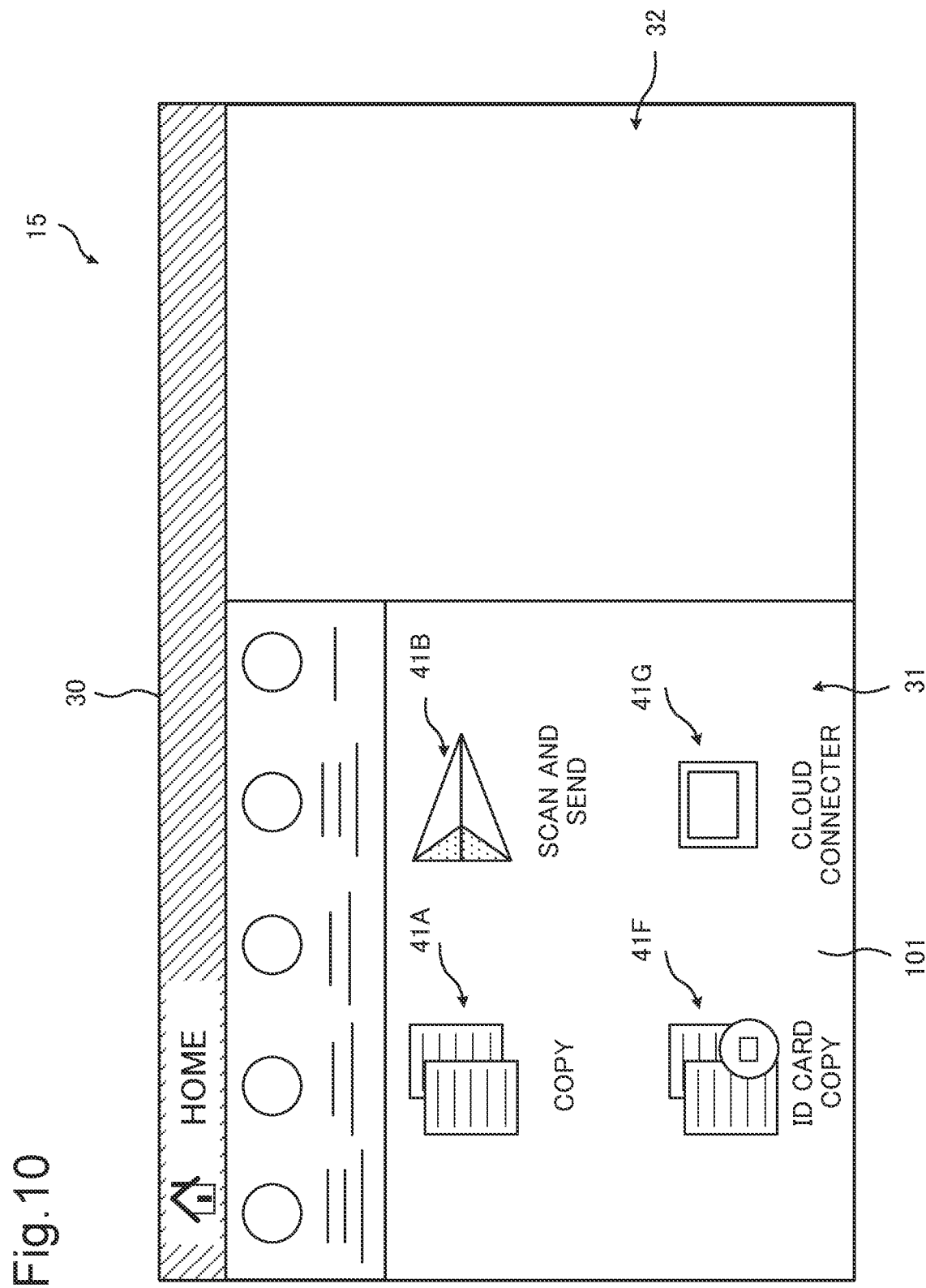
FIG. 10 is a view showing another example of a state where a portion of the scrollable menu image is displayed in the first region.
Figure 11:
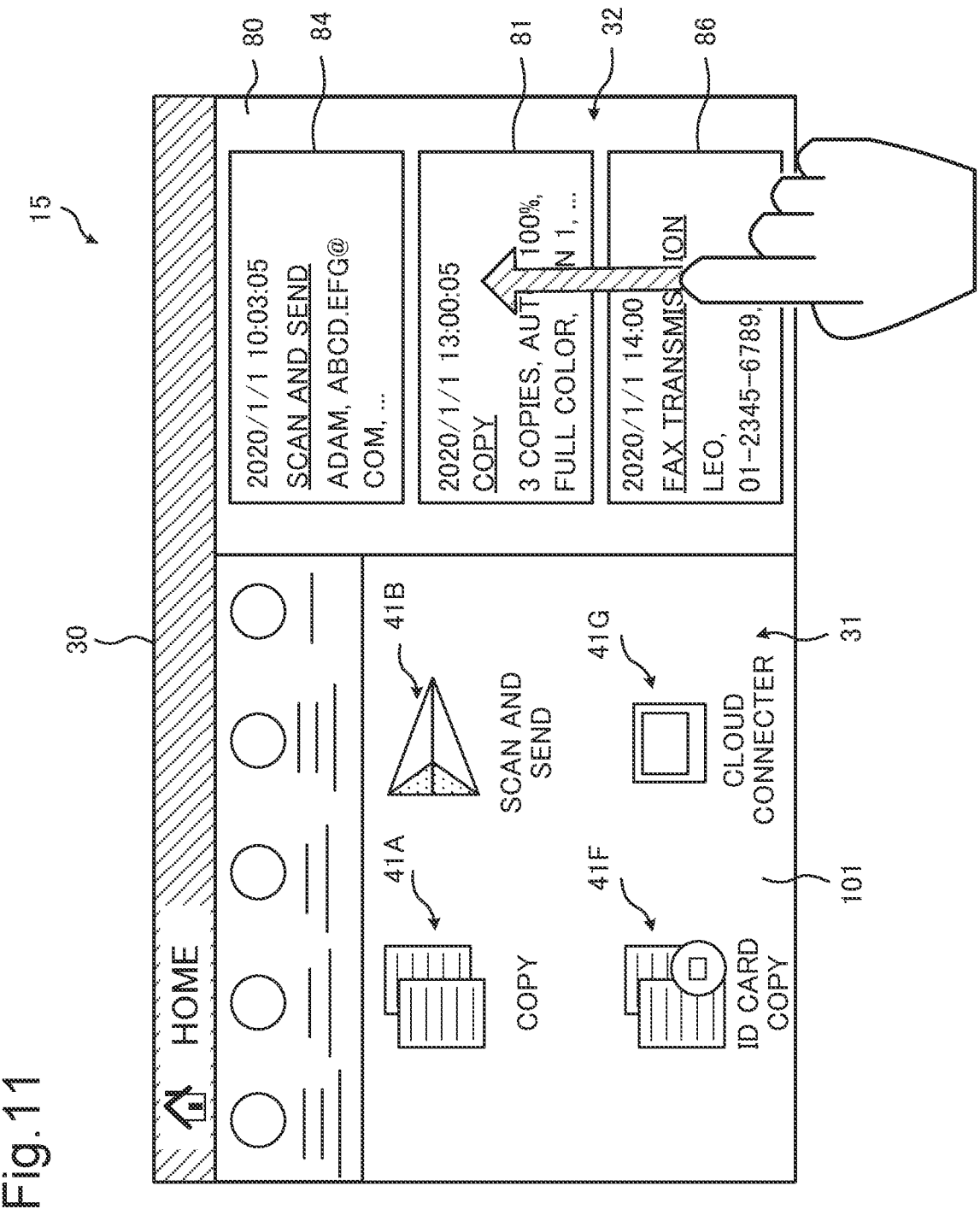
FIG. 11 is a view showing another example of a state where history buttons are displayed in the second region.
Figure 12:
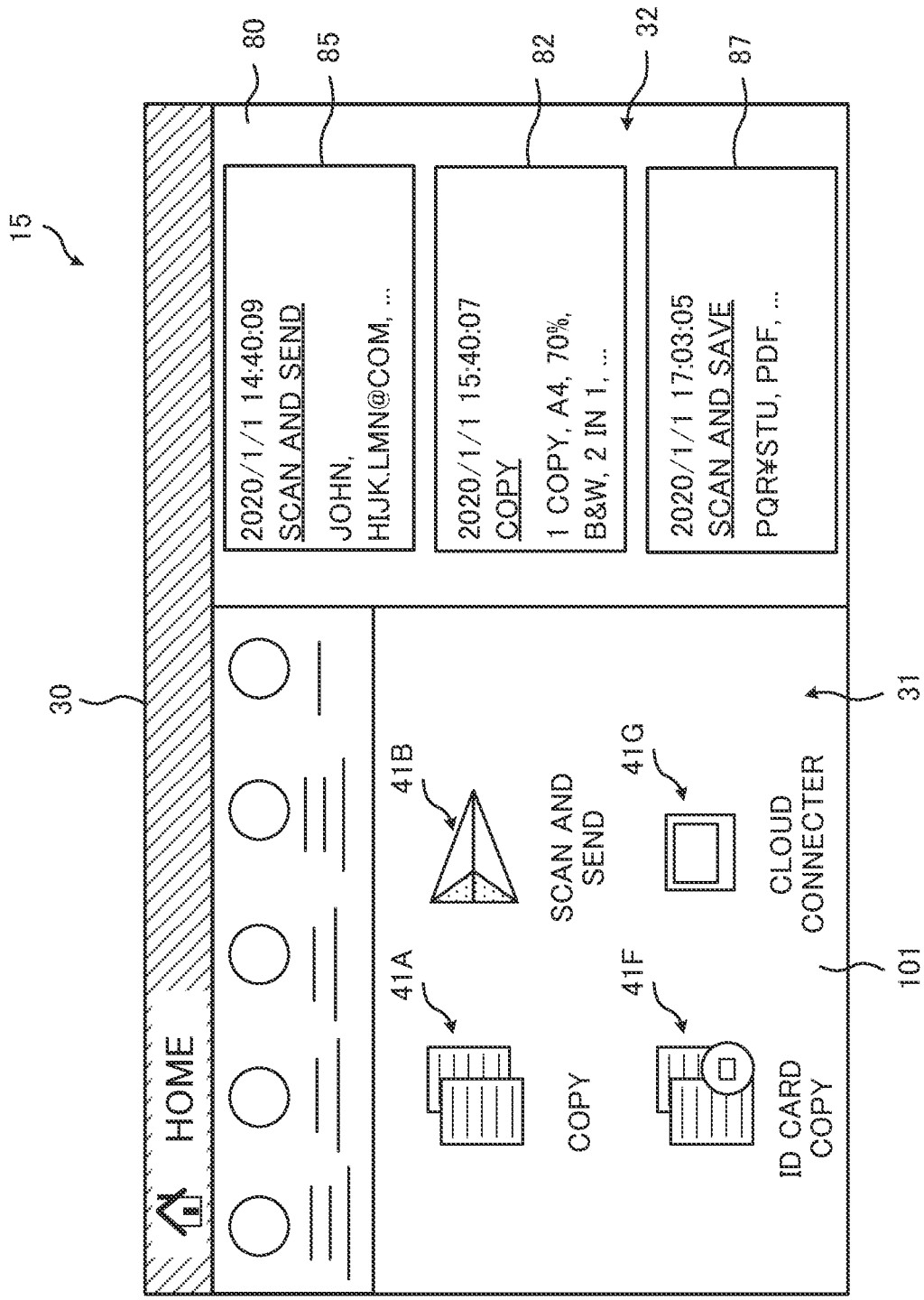
FIG. 12 is a view showing still another example of a state where history buttons are displayed in the second region.
Figure 13:
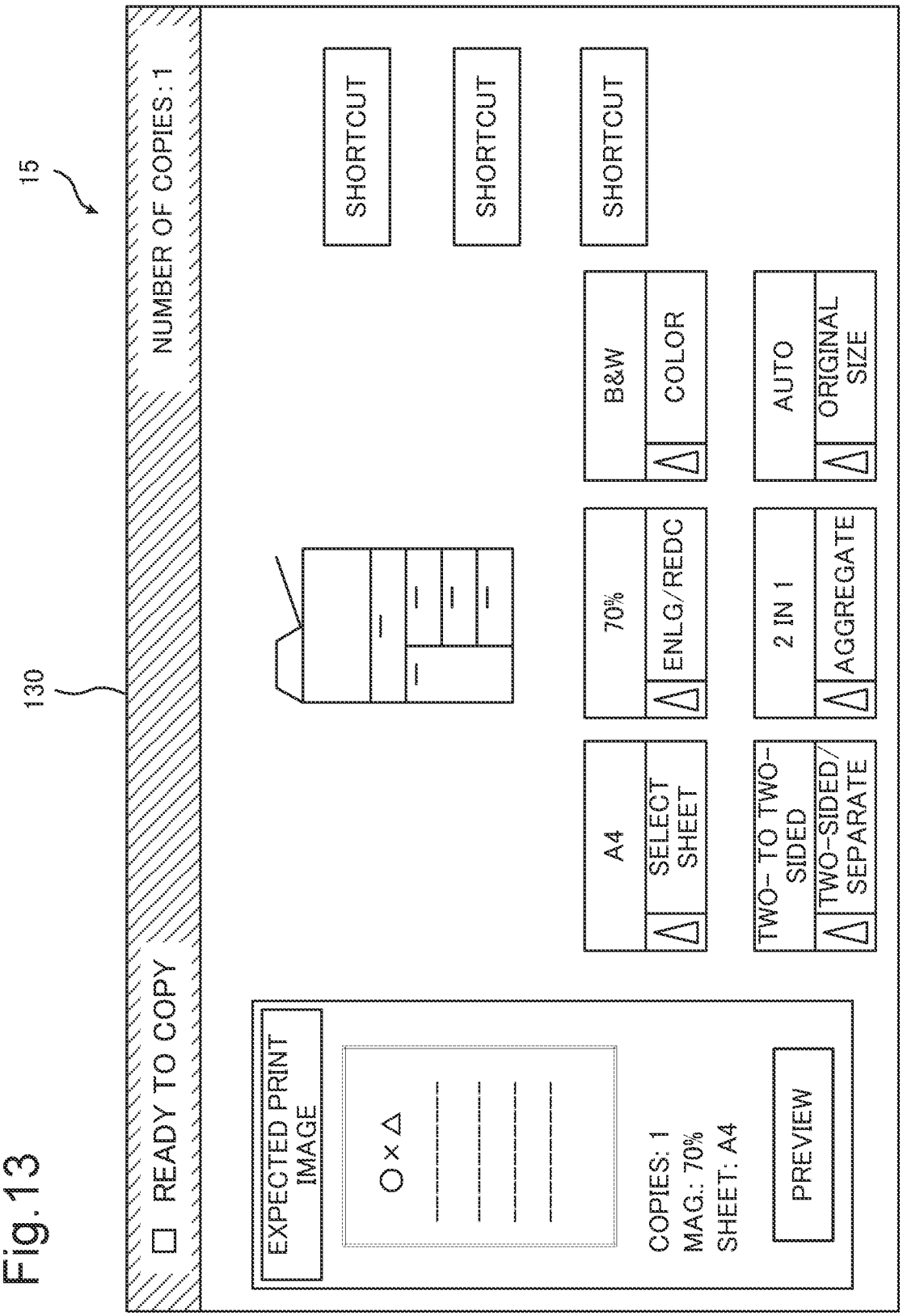
FIG. 13 is a view showing an example of a setting screen.

FIG. 6 is a flowchart showing first history button display processing. FIGS. 7 and 10 are views each showing a state where a portion of the scrollable menu image 40 is displayed in the first region 31. FIG. 8 is a view showing an example of a first history image. FIGS. 9, 11, and 12 are views each showing a state where history buttons are displayed in the second region 32. FIG. 13 is a view showing an example of a setting screen. A description will be given below of the operation of the image forming apparatus 1 when the first history button display processing is executed, with reference to FIGS. 3 to 13 and so on.

When the image forming apparatus 1 is powered on or when the controller 10 accepts through the touch panel 16B an instruction to display the home screen 30, the controller 10 starts the execution of the first history button display processing shown in FIG. 6 and allows the display device 15 to display the default home screen 30 stored in the HDD 18 (step S10). Here, the default size of the first region 31 is a size suitable to display eight icons arranged in two rows and four columns, without enlarging and reducing the scrollable menu image 40.

After the processing in step S10, as shown in FIG. 7, the controller 10 allows the display device 15 to display, in the first region 31, a portion 71 of the scrollable menu image 40 containing eight icons 41A, 41B, 41C, 41D, 41F, 41G, 41H, and 41I in two rows and four columns in accordance with the icon size "small" as the default setting and the value "8" of the number of icons stored in the HDD 18 in association with the icon size "small", without enlarging and reducing the scrollable menu image 40 (step S11).

After the processing in step S11, the controller 10 reads out all of combinations 50A, 50B, 50C, MA, 51B, 52A, and 53A of setting values contained in the HDD 18 (step S12). After the processing in step S12, as shown in FIG. 8, the controller 10 generates a first history image 80 containing history buttons 81, 82, 83, 84, 85, 86, and 87 of a predetermined "small" size containing the respective character strings indicating the read combinations 50A, 50B, 50C, 51A, 51B, 52A, and 53A of setting values, respectively (step S13). In doing so, the controller 10 generates the first history image 80 so that the history buttons 81, 82, 83, 84, 85, 86, and 87 are arranged along the longitudinal direction of the first history image 80 in chronological order according to the date of execution of jobs.

After the processing in step S13, as shown in FIG. 9, the controller 10 allows the display device 15 to display, in the second region 32, a portion of the first history image 80 containing six history buttons 84, 81, 86, 85, 82, and 87 in accordance with the size "small" of the history buttons and the value "6" of the number of history buttons, both stored in the HDD 18 in association with the icon size "small", without enlarging and reducing the first history image 80 (step S14).

After the processing in step S14, until the controller 10 accepts a specification instruction to specify the size of the icons through the touch panel 16B or until any one of the history buttons 81, 82, 83, 84, 85, 86, and 87 is touched on the touch panel 16B, the controller 10 repeats processing resulting in a determination that no specification instruction has been accepted (NO in step S15) and processing resulting in a determination that no touch gesture on any history button has been accepted (NO in step S16).

The user confirms the home screen 30 shown in FIG. 9 and inputs, through the touch panel 16B, a specification instruction to specify a "large" size as the size of the icons. When accepting the above specification instruction through the touch panel 16B (YES in step S15), the controller 10 allows the display device 15 to terminate the display of the scrollable menu image 40 and the first history image 80 being displayed in the first region 31 and the second region 32, respectively. Subsequently, the controller 10 allows the display device 15 to change the size of the first region 31 to a size suitable to display a number of icons according to the specified icon size in the specified icon size. Furthermore, the controller 10 allows the display device 15 to change the size of the second region 32 to a size suitable to display a number of history buttons according to the specified icon size in a history button size according to the specified icon size (step S17).

After the processing in step S17, the controller 10 enlarges the scrollable menu image 40 in accordance with the specified icon size "large" so that the size of the icons 41A to 41J becomes the predetermined "large" size, and, as shown in FIG. 10, allows the display device 15 to display, in the first region 31 changed in size, a portion 101 of the enlarged scrollable menu image 40 containing four icons 41A, 41B, 41F, and 41G in two rows and two columns in accordance with the value "4" of the number of icons stored in the HDD 18 in association with the specified icon size "large" (step S18).

After the processing in step S18, the controller 10 enlarges the first history image 80, in accordance with the size "large" of the history buttons stored in the HDD 18 in association with the specified icon size "large", so that the size of the history buttons 81 to 87 becomes the predetermined "large" size, and, as shown in FIG. 11, allows the display device 15 to display, in the second region 32 changed in size, a portion of the enlarged first history image 80 containing three history buttons 84, 81, and 86 in accordance with the value "3" of the number of history buttons stored in the HDD 18 in association with the specified icon size "large" (step S19). After the processing in step S19, the controller 10 goes back to the processing in step S15 and repeats processing resulting in a determination that no specification instruction has been accepted (NO in step S15) and processing resulting in a determination that no touch gesture on any history button has been accepted (NO in step S16).

As shown in FIG. 11, the user flicks the first history image 80 being displayed in the second region 32 toward one end of the first history image 80 in the longitudinal direction thereof. When accepting the flick gesture on the first history image 80 through the touch panel 16B, the controller 10 allows the display device 15 to scroll the first history image 80 within the second region 32 according to the distance of the flick gesture from the starting point to the end point, the speed of the flick gesture or so on.

In this case, as shown in FIG. 12, the controller 10 allows the display device 15 to scroll the first history image 80 until a portion of the first history image 80 containing history buttons 85, 82, and 87 is displayed in the second region 32. The user confirms the history buttons 85, 82, and 87 being displayed in the second region 32 and touches the history button 82.

When accepting the touch gesture on the history button 82 through the touch panel 16B (YES in step S16), the controller 10 allows the display device 15 to display, as shown in FIG. 13, a setting screen 130 for use in configuring the setting for the copy function associated with the history button 82, in a state where the setting screen 130 reflects the combination of setting values shown by the history button 82 (step S20). After the processing in step S20, the controller 10 ends the first history button display processing.

The user places an original document on the platen glass 7, confirms the setting screen 130, and then presses the Start key 16A. When detecting the pressing of the Start key 16A, the controller 10 allows, in accordance with the combination of setting values shown by the history button 82, the image reading device 11 to read the original document placed on the platen glass 7 to generate image data representing a document image, and then the image forming device 12 and so on to form the document image represented by the image data on a recording paper sheet P.

The controller 10 may allow the display device 15 to display the home screen 30 as shown in FIG. 11, i.e., the home screen 30 in which the display sizes of the icons and history buttons and the respective numbers of icons and history buttons displayed have been changed, after the elapse of a predetermined time since the end of the image formation on the recording paper sheet P. In doing so, the controller 10 generates a first history image 80 in which a history button showing the combination of setting values in the most recently executed image formation processing is prepended to the sequence of history buttons 81, 82, 83, 84, 85, 86, and 87 arranged in chronological order in the first history image 80 shown in FIG. 8, and allows the display device 15 to display the generated first history image 80 in the second region 32.

When accepting an instruction to execute a job through the operation device 16 while the setting screen 130 is displayed, the controller 10 executes the job for the copy function associated with the history button 82, in accordance with the combination of setting values shown by the history button 82. Alternatively, upon acceptance of a touch gesture on the history button 82 through the touch panel 16B, the controller 10 may execute the job for the copy function associated with the history button 82, in accordance with the combination of setting values shown by the history button 82.

When the user flicks or swipes the scrollable menu image 40 being displayed in the first region 31 toward one end or the other end of the scrollable menu image 40 in the longitudinal direction thereof, the controller 10 accepts the flick or swipe gesture through the touch panel 16B and allows the display device 15 to scroll the scrollable menu image 40 within the first region 31 according to the distance of the flick or swipe gesture from the starting point to the end point, the speed of the flick or swipe gesture or so on.

In the above-described general technique, the size of application buttons can be changed, but the size of history buttons cannot be changed, which may be user-unfriendly for some users.

In contrast, in the first embodiment, the controller 10 allows the display device 15 to display the icons 41A, 41B, 41C, 41D, 41F, 41G, 41H, and 41I in a "small" size in the first region 31 in accordance with the default setting and display the history buttons 84, 81, 86, 85, 82, and 87 in a "small" size in the second region 32 in accordance with the size of the history buttons stored in the HDD 18 in association with the icon size "small". Furthermore, upon acceptance of a specification instruction to specify a "large" size as the size of the icons through the touch panel 16B, the controller 10 allows the display device 15 to display, in the first region 31, the icons 41A, 41B, 41F, and 41G in the specified "large" size and display, in the second region 32, the history buttons 84, 81, and 86 in a "large" size in accordance with the size of the history buttons stored in the HDD 18 in association with the specified icon size "large".

When, as just described, the icons being displayed in the first region 31 are changed from a "small" size to a "large" size in response to the above-described specification instruction, the history buttons being displayed in the second region 32 are also changed from a "small" size to a "large" size. Therefore, the size of history buttons can be easily changed to a size highly likely to be desired by the user. Hence, as compared to the case where the size of history buttons cannot be changed, the visibility and operability of the user can be improved.

Furthermore, in the first embodiment, in displaying the icons 41A, 41B, 41C, 41D, 41F, 41G, 41H, and 41I in a "small" size, the controller 10 allows the display device 15 to display, in the first region 31, eight icons 41A, 41B, 41C, 41D, 41F, 41G, 41H, and 41I in accordance with the value "8" of the number of icons stored in the HDD 18 in association with the icon size "small" and display, in the second region 32, six history buttons 84, 81, 86, 85, 82, and 87 in accordance with the value "6" of the number of history buttons stored in the HDD 18 in association with the icon size "small".

In addition, in displaying the icons 41A, 41B, 41F, and 41G in a "large" size, the controller 10 allows the display device 15 to display, in the first region 31, four icons 41A, 41B, 41F, and 41G in accordance with the value "4" of the number of icons stored in the HDD 18 in association with the specified icon size "large" and display, in the second region 32, three history buttons 84, 81, and 86 in accordance with the value "3" of the number of history buttons stored in the HDD 18 in association with the specified icon size "large".

When, as just described, the number of icons being displayed in the first region 31 is changed from eight to four in response to the above-described specification instruction, the number of history buttons being displayed in the second region 32 is also changed from six to three. Therefore, the number of history buttons to be displayed can be easily changed to a number highly likely to be desired by the user. Hence, as compared to the case where the number of history buttons to be displayed cannot be changed, the operability of the user can be further improved.

(First Modification of First Embodiment)

Hereinafter, a description will be given of an image forming apparatus 1 according to a first modification of the first embodiment of the present disclosure, focusing on differences from the first embodiment. The image forming apparatus 1 according to the first modification has the same configuration as that according to the first embodiment, except that the HDD 18 holds, instead of the first program, a second program for executing second history button display processing according to the first modification and the HDD 18 previously stores a protected password "ABCDE".

[Operations]

Figure 14A:
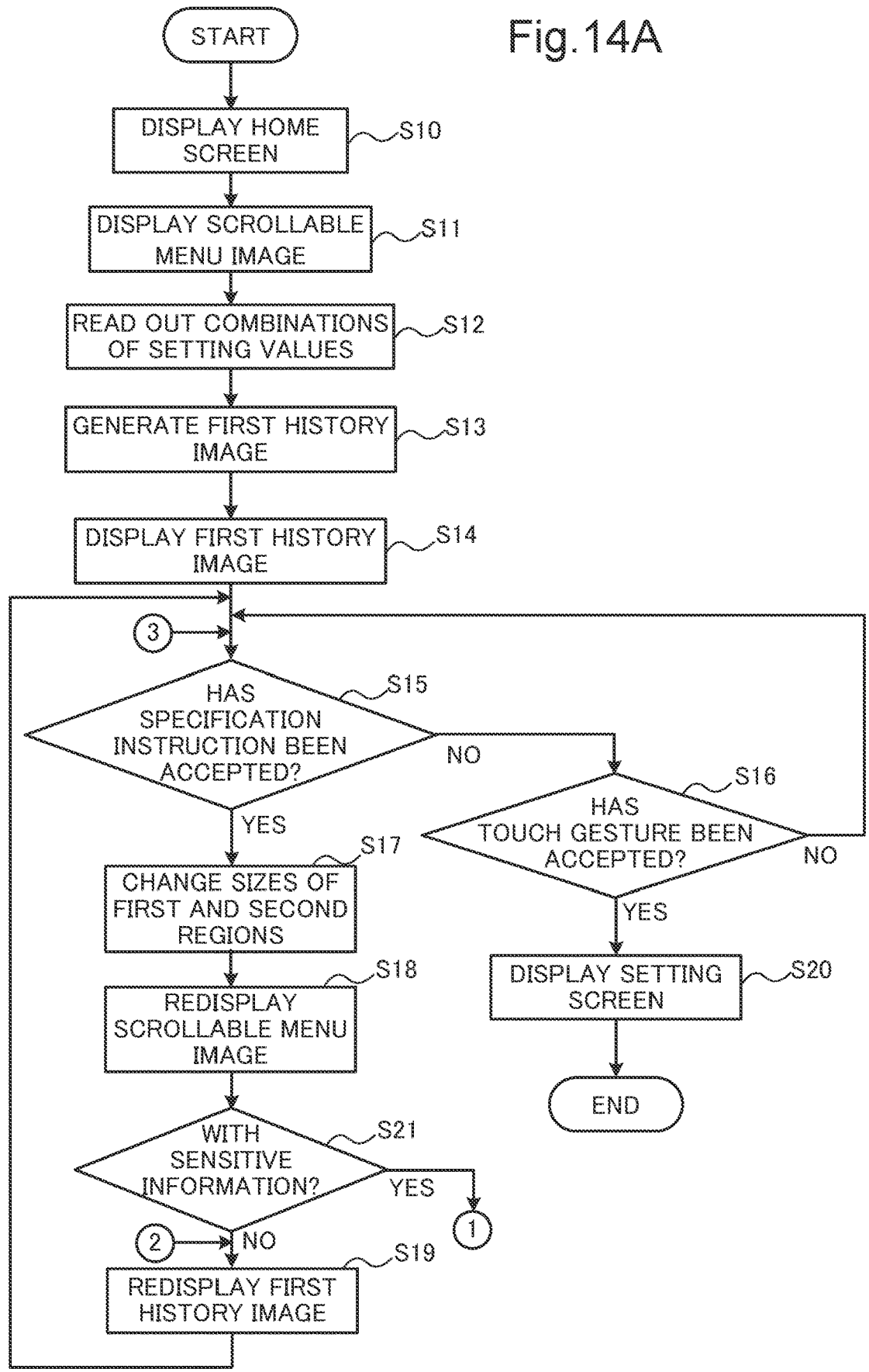
FIG. 14A is a portion of a flowchart showing second history button display processing.
Figure 14B:
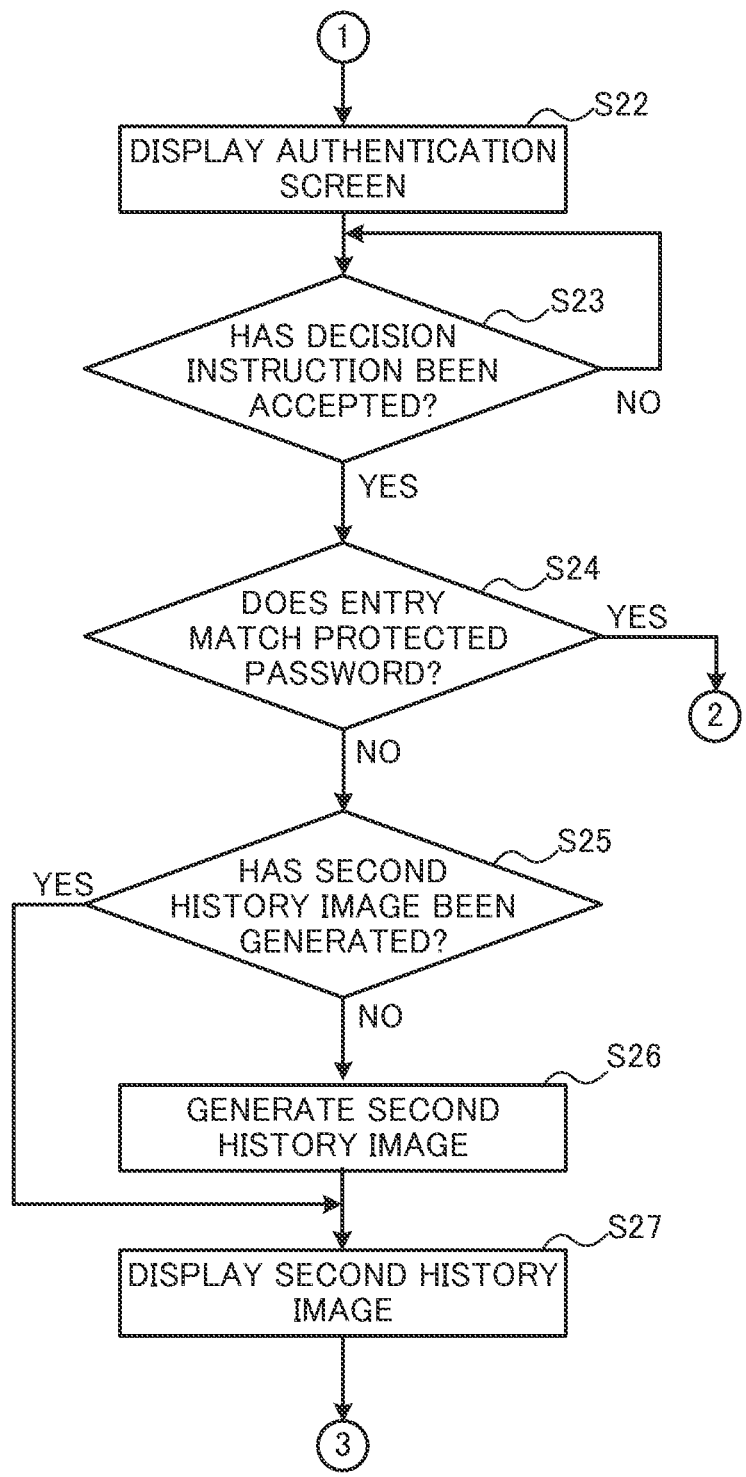
FIG. 14B is the rest of the flowchart showing the second history button display processing.
Figure 15:
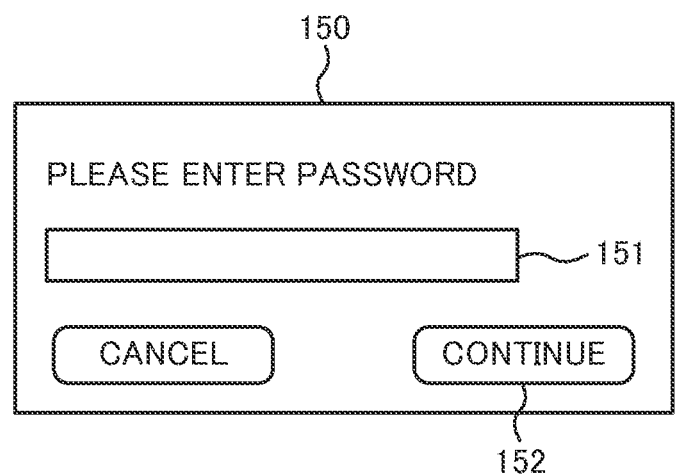
FIG. 15 is a view showing an example of an authentication screen.
Figure 16:
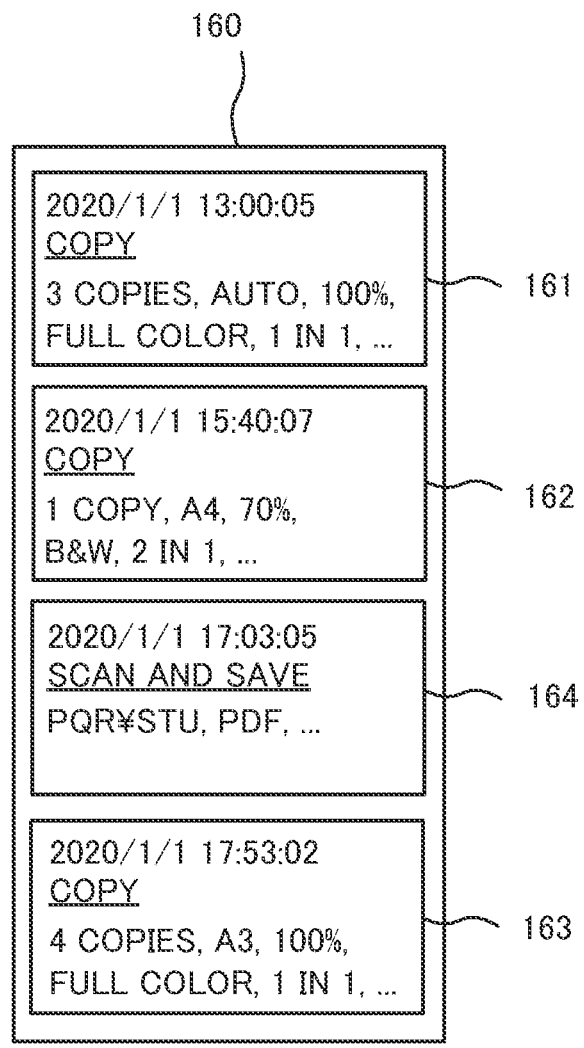
FIG. 16 is a view showing an example of a second history image.
Figure 17:
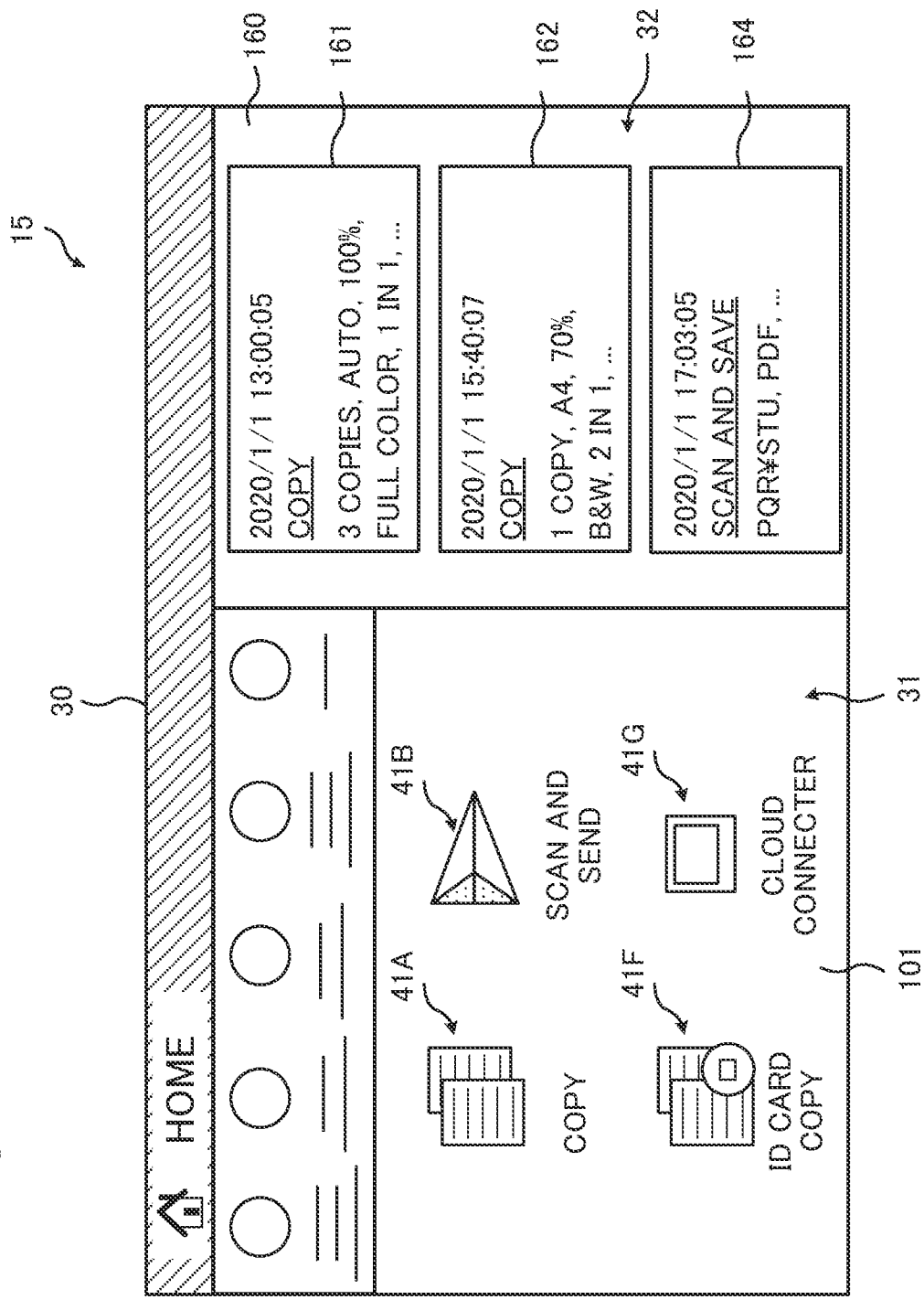
FIG. 17 is a view showing still another example of a state where history buttons are displayed in the second region.

FIGS. 14A and 14B show a flowchart showing the second history button display processing. FIG. 15 is a view showing an example of an authentication screen. FIG. 16 is a view showing an example of a second history image. FIG. 17 is a view showing a state where history buttons are displayed in the second region 32. A description will be given below of the operations of the image forming apparatus 1 according to the first modification with reference to FIGS. 14 to 17 and so on, but a repetitive description of the same operations as in the first embodiment will not be given. The second history button display processing is the same as the first history button display processing except for the processing from step S21 to step S27. In the description of the second history button display processing, the same processing steps as in the first history button display processing are designated by the same reference characters.

When the image forming apparatus 1 is powered on or when the controller 10 accepts through the touch panel 16B an instruction to display the home screen 30, the controller 10 starts the execution of the second history button display processing shown in FIGS. 14A and 14B and executes the processing from step S10 to step S16 in the same manner as described previously. The user confirms the home screen 30 and inputs, through the touch panel 16B, a specification instruction to specify a "large" size as the size of icons.

When accepting the above specification instruction through the touch panel 16B (YES in step S15), the controller 10 executes the processing in step S17 and the processing in step S18 in the same manner as described previously. After the processing in step S18, the controller 10 determines whether or not at least one of the combinations 50A, 50B, 50C, 51A, 51B, 52A, and 53A of setting values read in the processing in step S12 contains sensitive information (step S21). The sensitive information is, but not limited to, in this example, an e-mail address, a phone number, a facsimile number or an addressee.

In this case, the combinations 51A and 51B of setting values each contain an addressee and an e-mail address and the combination 52A of setting values contains an addressee and a facsimile number. Therefore, the controller 10 determines that the combinations 51A, 51B, and 52A of setting values contain sensitive information (YES in step S21), and allows the display device 15 to display an authentication screen 150 shown in FIG. 15 (step S22). After the processing in step S22, until a key 152 for use in inputting a decision instruction to decide the contents entered into a field 151 is touched, the controller 10 repeats processing resulting in a determination that no decision instruction has been accepted (NO in step S23).

Here, suppose that the user touches the key 152 without entering a password in the field 151. When accepting the touch gesture on the key 152 through the touch panel 16B, the controller 10 determines that a decision instruction has been accepted (YES in step S23) and determines whether or not the entered password matches the protected password stored in the HDD 18 (step S24).

In this case, the controller 10 determines that the entered password does not match the protected password (NO in step S24) and determines whether or not a second history image has been generated (step S25). In this case, the controller 10 determines that no second history image has been generated (NO in step S25) and, as shown in FIG. 16, generates a second history image 160 containing only history buttons 161, 162, 163, and 164 of a predetermined "small" size containing respective character strings indicating, among the combinations 50A, 50B, 50C, 51A, 51B, 52A, and 53A of setting values read in the processing in step S12, the combinations 50A, 50B, 50C, and 53A of setting values without any sensitive information, respectively (step S26). In doing so, the controller 10 generates the second history image 160 so that the history buttons 161, 162, 163, and 164 are arranged along the longitudinal direction of the second history image 160 in chronological order according to the date of execution of jobs.

After the processing in step S26, the controller 10 enlarges the second history image 160, in accordance with the size "large" of the history buttons stored in the HDD 18 in association with the specified icon size "large", so that the size of the history buttons 161 to 164 becomes the predetermined "large" size, and, as shown in FIG. 17, allows the display device 15 to display, in the second region 32 changed in size, a portion of the enlarged second history image 160 containing three history buttons 161, 162, and 164 in accordance with the value "3" of the number of history buttons stored in the HDD 18 in association with the specified icon size "large" (step S27). After the processing in step S27, the controller 10 goes back to the processing in step S15.

When determining that a second history image 160 has already been generated (YES in step S25), the controller 10 executes the processing in step S27 without executing the processing in step S26. When determining that none of the combinations 50A, 50B, 50C, 51A, 51B, 52A, and 53A of setting values read in the processing in step S12 contains any sensitive information (NO in step S21) or when determining that the password entered into the field 151 matches the protected password (YES in step S24), the controller 10 executes the processing in step S19 without executing the processing from step S22 to Step S27.

In the first modification, when the controller 10 accepts a password through the touch panel 16B and the entered password does not match the protected password stored in the HDD 18, the controller 10 allows the display device 15 to display, in the second region 32, a second history image 160 containing only history buttons 161, 162, 163, and 164 containing respective character strings indicating, among the read combinations 50A, 50B, 50C, 51A, 51B, 52A, and 53A of setting values, the combinations 50A, 50B, 50C, and 53A of setting values without any sensitive information, respectively. On the other hand, when the entered password matches the protected password, the controller 10 allows the display device 15 to display, in the second region 32, a first history image 80 containing history buttons 81, 82, 83, 84, 85, 86, and 87 containing respective character strings indicating all the read combinations 50A, 50B, 50C, 51A, 51B, 52A, and 53A of setting values, respectively.

Since, as can be seen from the above, no sensitive information is presented to any user not holding a protected password, the leakage of sensitive information can be prevented.

(Second Modification of First Embodiment)

Although in the first embodiment the controller 10 accepts a specification instruction to specify the icon size, the present disclosure is not limited to the manner described in the above embodiment. For example, the controller 10 may further accept, through the touch panel 16B, a specification instruction to specify the character size of the respective character strings contained in the icons 41A to 41J.

When accepting a specification instruction to specify the character size, the controller 10 allows the display device 15 to display, in the first region 31, the respective character strings contained in the icons 41A to 41J in the specified character size and also display, in the second region 32, the respective character strings indicating the respective combinations of setting values contained in the history buttons 81, 82, 83, 84, 85, 86, and 87 in the specified character size.

In the second modification, when, in response to the above-described specification instruction, the character size of the character strings contained in icons being displayed in the first region 31 is changed to a specified size, the character size of the character strings contained in history buttons being displayed in the second region 32 is also changed to the specified size. Therefore, the character size of the character strings contained in the history buttons can be easily changed to a size highly likely to be desired by the user. Hence, as compared to the case where the character size of the character strings contained in the history buttons cannot be changed, the operability of the user can be improved.

(Third Modification of First Embodiment)

Although, in the first embodiment, upon acceptance of a specification instruction to specify a "large" size as the size of the icons through the touch panel 16B, the controller 10 allows the display device 15 to display, in the first region 31, the icons 41A, 41B, 41F, and 41G in a "large" size without changing the form of the icons and display, in the second region 32, the history buttons 84, 81, and 86 in a "large" size without changing the form of the history buttons, the present disclosure is not limited to the manner described in the above embodiment. For example, the controller 10 may allow the display device 15 to display the form of the icons 41A, 41B, 41F, and 41G and history buttons 84, 81, and 86 in a simplified manner.

Figure 18:
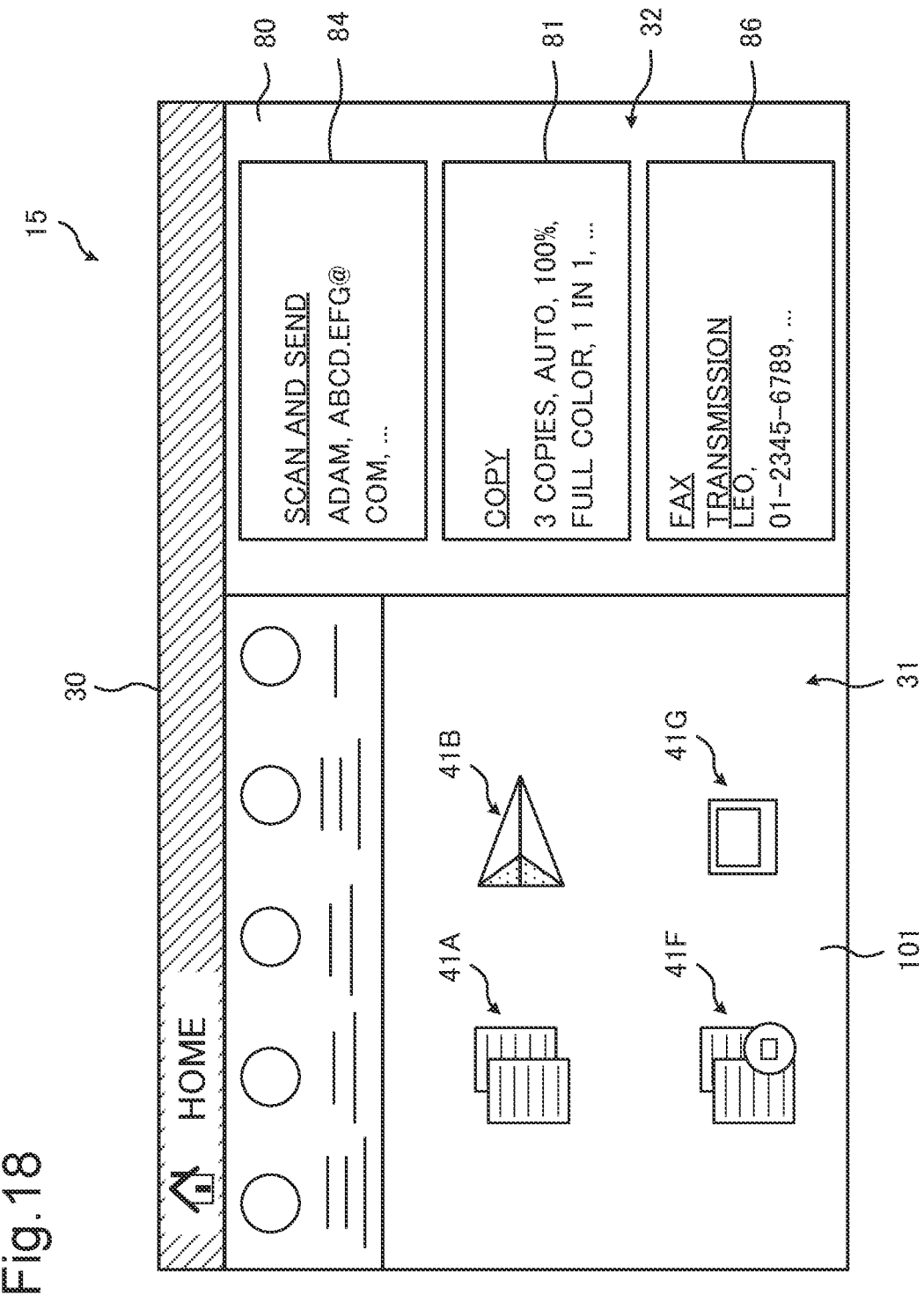
FIG. 18 is a view showing a state where icons and history buttons are displayed in a simplified manner.

FIG. 18 is a view showing a state where icons and history buttons are displayed in a simplified manner. No particular limitation is placed on the manner of simplifying the form of icons and history buttons. For example, as shown in FIG. 18, the controller 10 may change each of the icons 41A, 41B, 41F, and 41G to a form without the character string indicating the function, allow the display device 15 to display the icon in the changed from, change each of the history buttons 84, 81, and 86 to a form without the character string indicating the date of execution of a job, and allow the display device 15 to display the history button in the changed form.

In the third modification, when the form of icons being displayed in the first region 31 is simplified, the form of history buttons being displayed in the second region 32 is also simplified. Therefore, the form of history buttons can be easily changed to a form highly likely to be desired by the user. Hence, as compared to the case where the form of history buttons cannot be changed, the operability of the user can be improved.

(Other Modifications of First Embodiment)

Although in the first embodiment the controller 10 accepts, as an instruction to specify the icon size, a specification instruction to specify a "large" or "small" size as the icon size, the present disclosure is not limited to the manner described in the above embodiment. For example, the controller 10 may accept, as an instruction to specify the icon size, a specification instruction to specify a universal mode.

When accepting a specification instruction to specify a universal mode, the controller 10 allows the display device 15 to display, in accordance with the specified universal mode, the icons 41A, 41B, 41F, and 41G to be displayed in the first region 31, for example, as shown in FIG. 18, in a universal design simplified in a "large" size in the first region 31 and also display the history buttons 84, 81, and 86 to be displayed in the second region 32 in a universal design simplified in a "large" size in the second region 32.

As just described, when the form of icons being displayed in the first region 31 is changed to a universal design, the form of history buttons being displayed in the second region 32 is also changed to a universal design. Therefore, the form of history buttons can be easily changed to a form highly likely to be desired by the user. Hence, as compared to the case where the form of history buttons cannot be changed, the operability of the user can be improved.

Second Embodiment

Hereinafter, a description will be given of an image forming apparatus 1 according to a second embodiment of the present disclosure, focusing on differences from the first embodiment. The image forming apparatus 1 according to the second embodiment has the same configuration as that according to the first embodiment, except for the following points.

In the second embodiment, the HDD 18 holds, instead of the first program, a change program for executing size ratio change processing according to the second embodiment. By operating in accordance with the above change program, the controller 10 executes size ratio change processing for changing the size ratio between the first region 31 and the second region 32 to a size ratio specified through the touch panel 16B.

The HDD 18 holds, as second information instead of the first information, a plurality of setting combinations, each consisting of a value of the number of columns for arranging the history buttons and a value of the number of history buttons per column, which define the number and arrangement of history buttons to be displayed in the second region 32 and vary according to the size ratio between the first region 31 and the second region 32. In this relation, the HDD 18 holds, as default settings, a value "1" of the number of columns and a value "6" of the number of history buttons per column in association with a size ratio of "4:1". The HDD 18 also holds a value "2" of the number of columns and a value "4" of the number of history buttons per column in association with a size ratio of "1:1".

[Operations]

Figure 19:
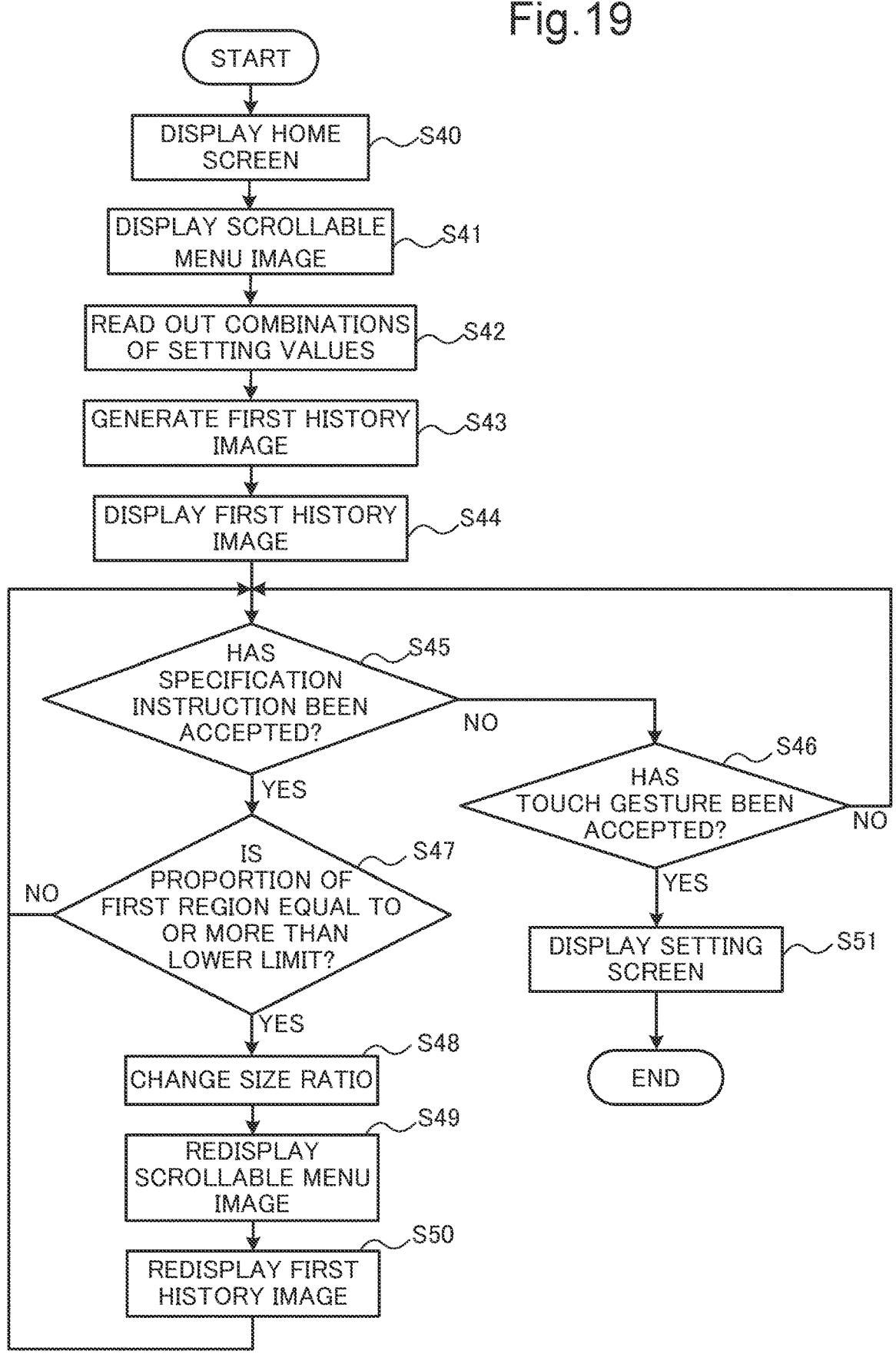
FIG. 19 is a flowchart showing size ratio change processing.
Figure 20:
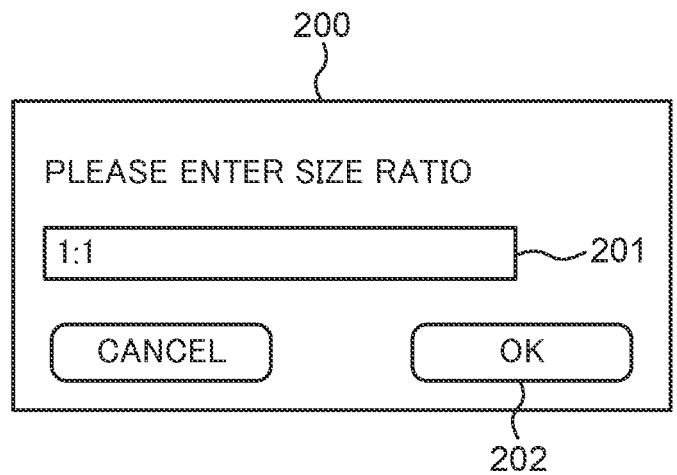
FIG. 20 is a view showing an example of a change screen.
Figure 21:
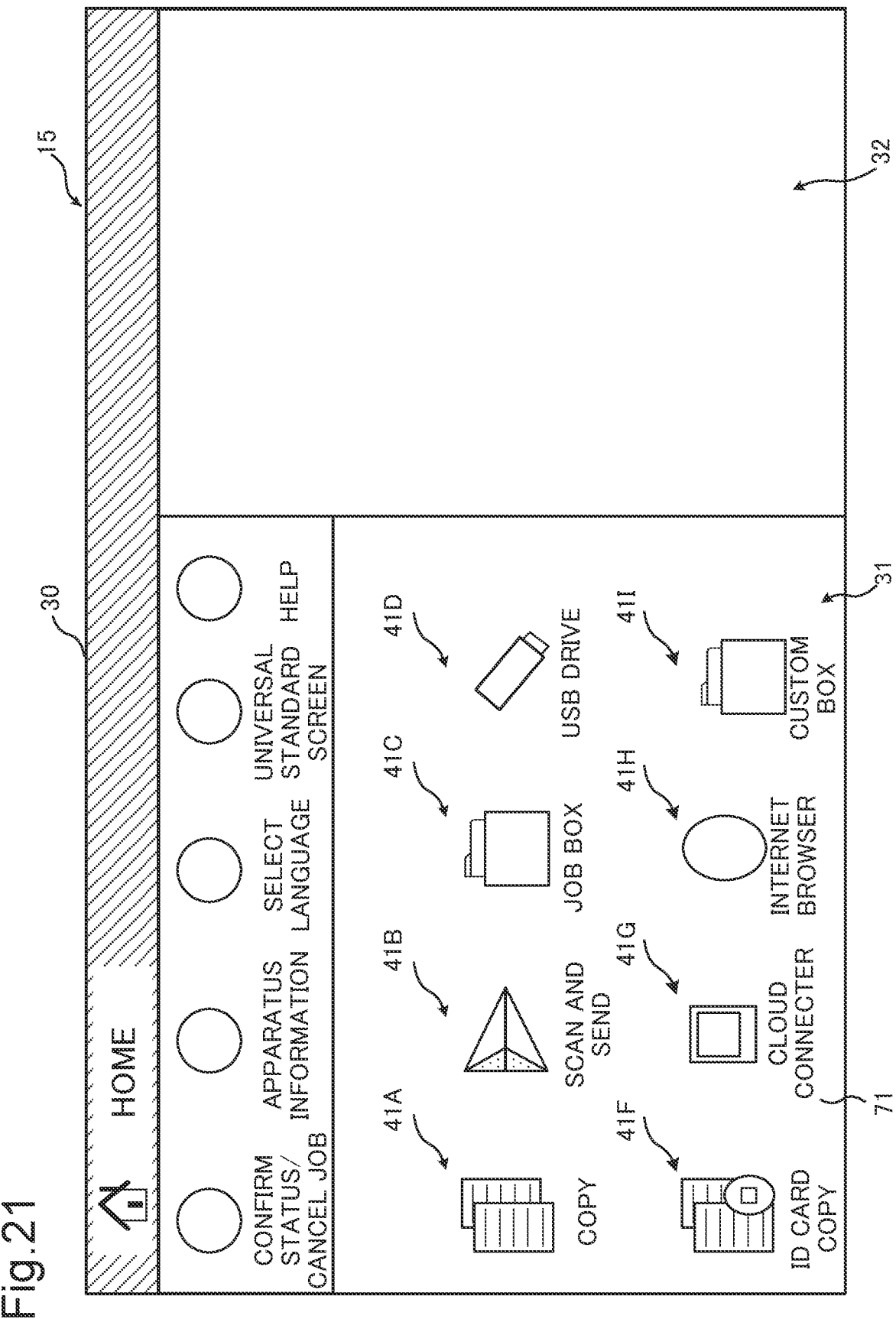
FIG. 21 is a view showing still another example of a state where a portion of the scrollable menu image is displayed in the first region.
Figure 22:
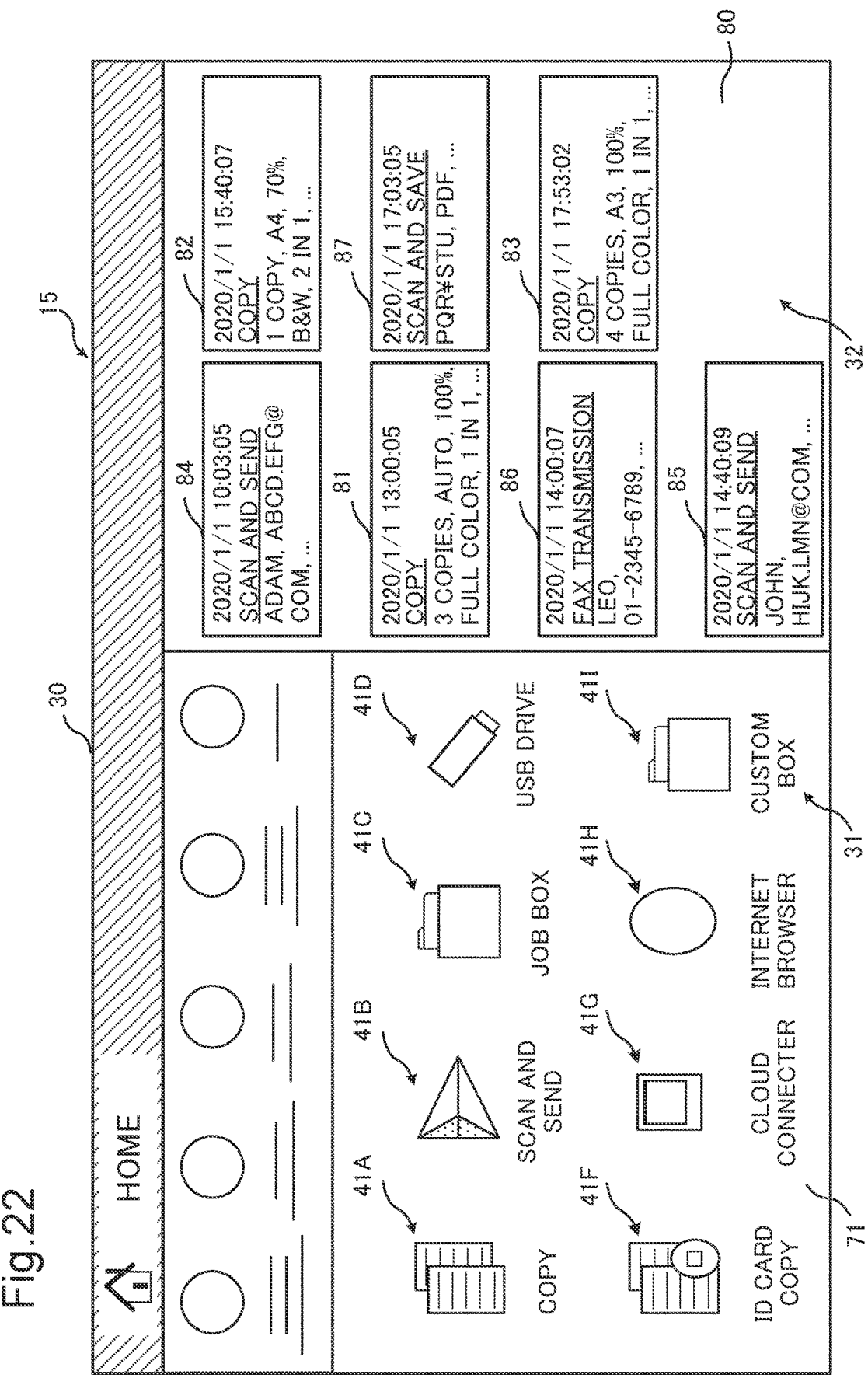
FIG. 22 is a view showing still another example of a state where history buttons are displayed in the second region.

FIG. 19 is a flowchart showing the size ratio change processing. FIG. 20 is a view showing an example of a change screen. FIG. 21 is a view showing a state where a portion of the scrollable menu image 40 is displayed in the first region 31. FIG. 22 is a view showing a state where history buttons are displayed in the second region 32. A description will be given below of the operations of the image forming apparatus 1 according to the second embodiment in executing the size ratio change processing, with reference to FIGS. 19 to 22 and so on, but a repetitive description of the same operations as in the first embodiment will not be given.

Hereinafter, suppose that the number of icon columns for use in displaying icons in the first region 31 is fixed at "4" and the number of icons per icon column is fixed at "2". When the image forming apparatus 1 is powered on or when the controller 10 accepts through the touch panel 16B an instruction to display the home screen 30, the controller 10 starts the execution of the size ratio change processing shown in FIG. 19 and allows the display device 15 to display the default home screen 30 stored in the HDD 18 (step S40).

In doing so, the controller 10 allows the display device 15 to display the first region 31 and the second region 32 at a default size ratio of "4:1" and display the second region 32 at one end of the home screen 30 in the longitudinal direction thereof.

After the processing in step S40, as shown in FIG. 7, the controller 10 allows the display device 15 to display, in the first region 31, a portion 71 of the scrollable menu image 40 containing eight icons 41A, 41B, 41C, 41D, 41F, 41G, 41H, and 41I in two rows and four columns, without enlarging and reducing the scrollable menu image 40 (step S41). After the processing in step S41, the controller 10 reads out all of combinations of setting values 50A, 50B, 50C, MA, 51B, 52A, and 53A contained in the HDD 18 (step S42).

After the processing in step S42, as shown in FIG. 8, the controller 10 generates a first history image 80 containing history buttons 81, 82, 83, 84, 85, 86, and 87 containing the respective character strings indicating the read combinations 50A, 50B, 50C, 51A, 51B, 52A, and 53A of setting values, respectively (step S43). In doing so, the controller 10 generates the first history image 80 so that the history buttons 81, 82, 83, 84, 85, 86, and 87 are arranged along the longitudinal direction of the first history image 80 in chronological order according to the date of execution of jobs.

After the processing in step S43, as shown in FIG. 9, the controller 10 allows the display device 15 to display, in the second region 32, a portion of the first history image 80 containing six history buttons 84, 81, 86, 85, 82, and 87 in a single column in accordance with the value "1" of the number of columns and the value "6" of the number of history buttons per column, both stored in the HDD 18 in association with the size ratio of "4:1" (step S44).

After the processing in step S44, until the controller 10 accepts a specification instruction to specify the size ratio through the touch panel 16B or until any one of the history buttons 81, 82, 83, 84, 85, 86, and 87 is touched on the touch panel 16B, the controller 10 repeats processing resulting in a determination that no specification instruction has been accepted (NO in step S45) and processing resulting in a determination that no touch gesture on any history button has been accepted (NO in step S46).

The user confirms the home screen 30 and inputs, through the touch panel 16B, a display instruction to display a change screen for use in changing the size ratio. When accepting the above display instruction through the touch panel 16B, the controller 10 allows the display device 15 to display a change screen 200 shown in FIG. 20.

The user touches a field 201 and enters a character string "1:1" indicating a size ratio through the touch panel 16B. When accepting the above entry through the touch panel 16B, the controller 10 allows the display device 15 to display the entered size ratio in the field 201. The user confirms the contents being displayed in the field 201 and touches a key 202.

When accepting the touch gesture on the key 202 through the touch panel 16B, the controller 10 determines that a specification instruction has been accepted (YES in step S45) and determines whether or not the proportion of the first region 31 represented by the specified size ratio is equal to or more than a predetermined lower limit (step S47). No particular limitation is placed on the predetermined lower limit, but, in this example, the lower limit is "2:3".

In this case, the controller 10 determines that the proportion of the first region 31 represented by the specified size ratio of "1:1" is equal to or more than the predetermined lower limit (YES in step S47) and allows the display device 15 to terminate the display of the scrollable menu image 40 and the first history image 80 and display the first region 31 and the second region 32 at the specified size ratio of "1:1" (step S48).

After the processing in step S48, the controller 10 changes the size of the scrollable menu image 40 so that the portion 71 fits into the first region 31 changed in size ratio, and, as shown in FIG. 21, allows the display device 15 to display, in the first region 31, the portion 71 of the scrollable menu image 40 changed in size (step S49).

After the processing in step S49, as shown in FIG. 22, the controller 10 allows the display device 15 to display, in the second region 32, a portion of the first history image 80 containing four history buttons 84, 81, 86, and 85 and a portion of the first history image 80 containing three history buttons 82, 87, and 83 to form two columns alongside each other in accordance with the value "2" of the number of columns and the value "4" of the number of history buttons per column, both stored in the HDD 18 in association with the size ratio of "1:1" (step S50).

After the processing in step S50, the controller 10 goes back to the processing in step S45 and repeats processing resulting in a determination that no specification instruction has been accepted (NO in step S45) and processing resulting in a determination that no touch gesture on any history button has been accepted (NO in step S46). The user confirms the history buttons 84, 81, 86, 85, 82, 87, and 83 being displayed in the second region 32 and touches the history button 82.

When accepting the touch gesture on the history button 82 through the touch panel 16B (YES in step S46), the controller 10 allows the display device 15 to display, as shown in FIG. 13, a setting screen 130 for use in configuring the setting for the copy function associated with the history button 82, in a state where the setting screen 130 reflects the combination of setting values shown by the history button 82 (step S51). After the processing in step S51, the controller 10 ends the size ratio change processing.

The user places an original document on the platen glass 7, confirms the setting screen 130, and then presses the Start key 16A. When detecting the pressing of the Start key 16A, the controller 10 allows, in accordance with the combination of setting values shown by the history button 82, the image reading device 11 to read the original document placed on the platen glass 7 to generate image data representing a document image, and then the image forming device 12 and so on to form the document image represented by the image data on a recording paper sheet P.

The controller 10 may allow the display device 15 to display the home screen 30 as shown in FIG. 22, i.e., the home screen 30 in which the size ratio between the first region 31 and the second region 32 has been changed, after the elapse of a predetermined time since the end of the image formation on the recording paper sheet P. In doing so, the controller 10 generates a first history image 80 in which a history button showing the combination of setting values in the most recently executed image formation processing is prepended to the sequence of history buttons 81, 82, 83, 84, 85, 86, and 87 arranged in chronological order in the first history image 80 shown in FIG. 8, and allows the display device 15 to display the generated first history image 80 in the second region 32.

When accepting an instruction to execute a job through the operation device 16 while the setting screen 130 is displayed, the controller 10 executes the job for the copy function associated with the history button 82, in accordance with the combination of setting values shown by the history button 82. Alternatively, upon acceptance of a touch gesture on the history button 82 through the touch panel 16B, the controller 10 may execute the job for the copy function associated with the history button 82, in accordance with the combination of setting values shown by the history button 82.

When the specified size ratio is, for example, "1:4", the controller 10 determines that the proportion of the first region 31 represented by the specified size ratio is less than the predetermined lower limit (NO in step S47) and goes back to the processing in step S45, without proceeding to the processing in step S48. In this case, for example, the controller 10 may allow the display device 15 to display an error message "SPECIFIED SIZE RATIO CANNOT BE USED." or the like prior to return to the processing in step S45.

In the above-described general technique, the size ratio between the region where application buttons are displayed and the other region where history buttons are displayed, and the locations of these regions are fixed, which may be user-unfriendly for some users.

In contrast, in the second embodiment, the controller 10 allows the display device 15 to display the first region 31 and the second region 32 at a default size ratio of "4:1" and, upon acceptance of a specification instruction to specify a size ratio of "1:1" through the touch panel 16B, allows the display device 15 to display the first region 31 and the second region 32 at the specified size ratio.

By specifying the size ratio through the touch panel 16B in the manner described above, the user can easily change the size ratio between the first region 31 and the second region 32 to a desired size ratio. Therefore, the freedom of screen change can be increased, so that the operability of the user can be improved.

In the second embodiment, in displaying the first region 31 and the second region 32 at a size ratio of "4:1", the controller 10 allows the display device 15 to display, in the second region 32, a portion of the first history image 80 containing six history buttons 84, 81, 86, 85, 82, and 87 in a single column in accordance with the value "1" of the number of columns and the value "6" of the number of history buttons per column, both stored in the HDD 18 in association with the size ratio of "4:1". On the other hand, in displaying the first region 31 and the second region 32 at a specified size ratio of "1:1", the controller 10 allows the display device 15 to display, in the second region 32, a portion of the first history image 80 containing four history buttons 84, 81, 86, and 85 and a portion of the first history image 80 containing three history buttons 82, 87, and 83 to form two columns alongside each other in accordance with the value "2" of the number of columns and the value "4" of the number of history buttons per column, both stored in the HDD 18 in association with the specified size ratio.

As seen from the above, the number and arrangement of history buttons being displayed in the second region 32 are changed according to the size ratio between the first region 31 and the second region 32. Therefore, the number and arrangement of history buttons can be easily changed to a number and arrangement highly likely to be desired by the user. Hence, as compared to the case where the number and arrangement of history buttons to be displayed cannot be changed according to the size ratio, the visibility and operability of the user can be improved.

In the second embodiment, when the proportion of the first region 31 represented by the specified size ratio is not less than the predetermined lower limit, the controller 10 allows the display device 15 to display the first region 31 and the second region 32 at the specified size ratio. When the proportion of the first region 31 represented by the specified size ratio is less than the above lower limit, the controller 10 keeps the display device 15 from displaying the first region 31 and the second region 32 at the specified size ratio.

Thus, it can be prevented that the first region 31 where a predetermined number of icons are to be displayed is excessively reduced in size by a change in size ratio. Therefore, even if the size ratio between the first region 31 and the second region 32 is changed, the user can surely recognize the contents represented by the icons.

(First Modification of Second Embodiment)

Although in the second embodiment the user inputs a specification instruction to specify the size ratio with a touch gesture or the like on the change screen 20 through the touch panel 16B, the present disclosure is not limited to the manner described in the above embodiment. For example, the user may input the above specification instruction with a gesture manipulation on the home screen 30 through the touch panel 16B.

Figure 23:
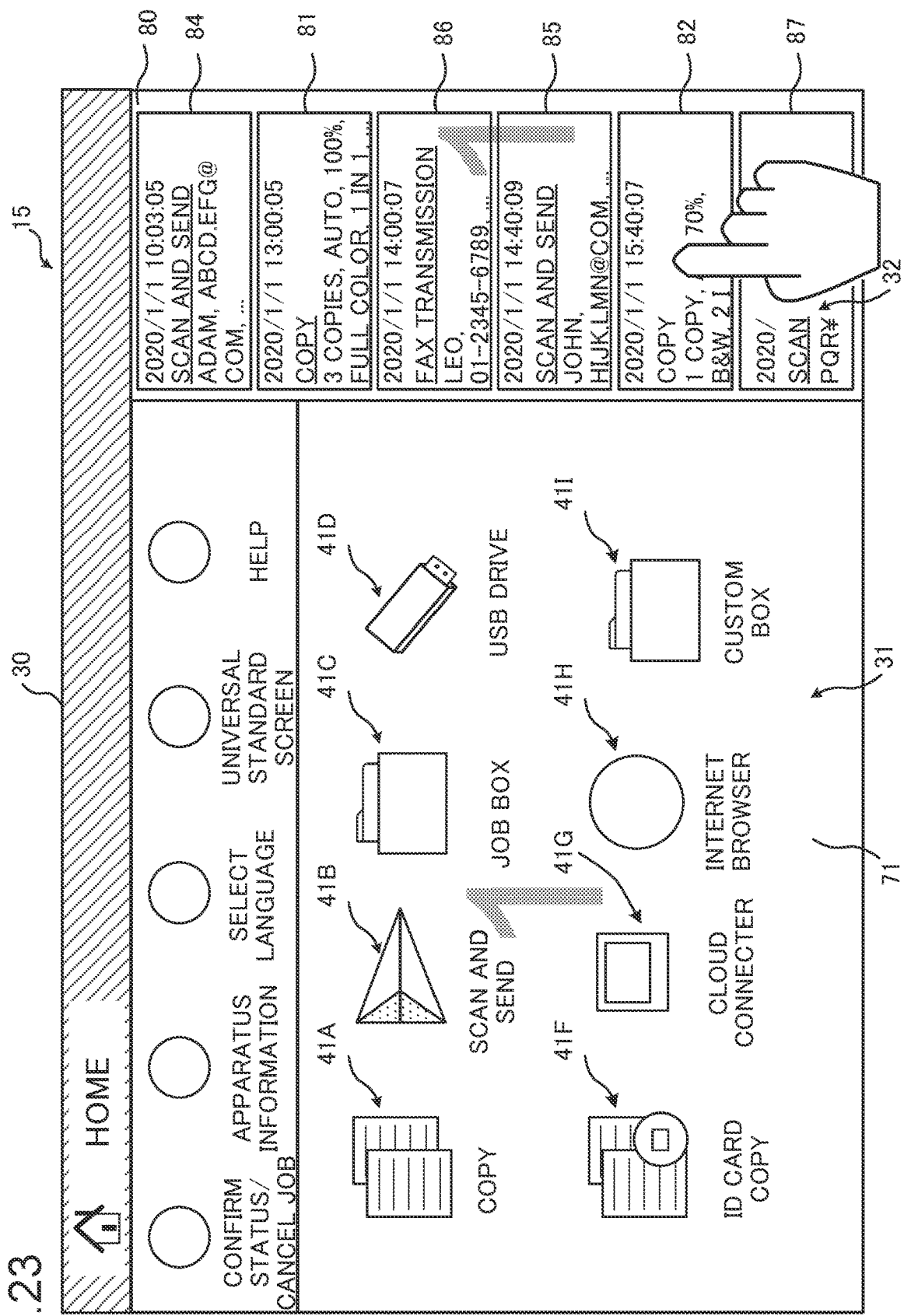
FIG. 23 is a view showing an example of a gesture manipulation.

FIG. 23 is a view showing an example of a gesture manipulation. For example, as shown in FIG. 23, the user does a first gesture manipulation describing a figure of "1" on the first region 31 and does a second gesture manipulation describing a figure of "1" on the second region 32. In this case, when accepting the first gesture manipulation on the first region 31 and the second gesture manipulation on the second region 32 through the touch panel 16B, the controller 10 acquires as a proportion of the first region 31 in a size ratio the figure described by the first gesture manipulation and acquires as a proportion of the second region 32 in the size ratio the figure described by the second gesture manipulation, thus accepting a specification instruction to specify a size ratio of "1:1".

Since in the first modification the user can specify a size ratio while looking at the first region 31 and the second region 32, the user can easily recognize a desired size ratio. Therefore, the operability of the user can be further improved.

The first modification may be configured as follows. For example, if the user desires to confirm, not the icons, but the history buttons only, the user does a first gesture manipulation describing a figure of "0" on the first region 31 and does a second gesture manipulation describing a figure of "1" on the second region 32. Based on the first gesture manipulation and second gesture manipulation that the controller 10 has accepted through the touch panel 16B, the controller 10 accepts a specification instruction to specify a size ratio of "0:1". In this case, the controller 10 allows the display device 15 to display the second region 32, without displaying the first region 31, on the home screen 30.

(Second Modification of Second Embodiment)

Although in the second embodiment the controller 10 accepts a specification instruction to specify the size ratio through the touch panel 16B, the present disclosure is not limited to the manner described in the above embodiment. For example, the controller 10 may further accept, through the touch panel 16B, a location specifying instruction to specify the location of the second region 32. FIG. 24 is a view showing a state of the home screen 30 where the location of the second region 32 has been changed.

For example, the controller 10 accepts, through the touch panel 16B, not only a specification instruction to specify a size ratio of "1:1" but also a location specifying instruction to specify as the location of the second region 32 the other end of the home screen 30 in the longitudinal direction thereof. In this case, as shown in FIG. 24, the controller 10 allows the display device 15 to display the first region 31 and the second region 32 at a size ratio of "1:1" and display the second region 32 at the other end of the home screen 30 in the longitudinal direction thereof.

Since in the second modification the user can change the location of the second region 32, for example, according to the user's dominant hand, the freedom of screen change can be increased, so that the operability of the user can be further improved.

Alternatively, when accepting through the touch panel 16B a location specifying instruction to specify as the location of the second region 32 one end or the other end of the home screen 30 in the widthwise direction thereof, the controller 10 allows the display device 15 to display the second region 32 at one end or the other end of the home screen 30 in the widthwise direction thereof (Third Modification of Second Embodiment)

In the second embodiment, when the size ratio between the first region 31 and the second region 32 is changed from "4:1" to "1:1", so that the size of the first region 31 is reduced, the controller 10 allows the display device 15 to display the icons 41A, 41B, 41C, 41F, 41G, 41H, and 41I, without changing their forms, in the first region 31. However, the present disclosure is not limited to the manner described in the above embodiment. For example, when the size of the first region 31 is reduced, the controller 10 may allow the display device 15 to display the form of the icons 41A, 41B, 41C, 41F, 41G, 41H, and 41I contained in the portion 71 in a simplified manner.

FIG. 25 is a view showing a state where icons are displayed in a simplified manner. No particular limitation is placed on the manner of simplifying the form of icons. For example, as shown in FIG. 25, the controller 10 may change each of the icons 41A, 41B, 41C, 41F, 41G, 41H, and 41I to a form without the character string indicating the function and allow the display device 15 to display the icon in the changed from.

(Other Modifications of Second Embodiment)

In the second embodiment, once allowing the display device 15 to display the first region 31 and the second region 32 at a specified size ratio of "1:1", the controller 10 allows the display device 15 to maintain the changed size ratio. However, the present disclosure is not limited to the manner described in the above embodiment. For example, after the elapse of a predetermined time since the controller 10 has allowed the display device 15 to display the first region 31 and the second region 32 at a size ratio of "1:1", the controller 10 may allow the display device 15 to display the first region 31 and the second region 32 at a size ratio of "4:1" used before being changed.

Since, as just described, the size ratio is returned to an original ratio after the elapse of the predetermined time, even if the user has forgotten to return the size ratio to the original ratio, the operability of a next user using the image forming apparatus 1 can be prevented from being impaired.

In the second embodiment, when accepting a specification instruction through the touch panel 16B, the controller 10 allows the display device 15 to change the number and arrangement of history buttons to be displayed in the second region 32. However, the present disclosure is not limited to the manner described in the above embodiment. For example, when accepting a specification instruction through the touch panel 16B, the controller 10 may allow the display device 15 to change only the size ratio between the first region 31 and the second region 32, and not to change the number and arrangement of history buttons to be displayed in the second region 32.

The present disclosure is not limited to the structure of the above embodiments and can be modified in various ways. For example, although in the above embodiments a multi-color multifunction peripheral is used as the image forming apparatus 1, it is merely illustrative and any other image forming apparatuses, such as a black-and-white multifunction peripheral, a copier, and a facsimile machine, may be used.

The structures, configurations, and processing described in the above embodiments with reference to FIGS. 1 to 25 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
  a display device including a display area;
  an operation device that includes a touch panel provided on the display device and accepts an instruction from a user;
  a storage device that stores a plurality of respective combinations of setting values set in jobs previously executed in relation to each of a plurality of predetermined functions; and
  a control device that includes a processor and functions as a controller through the processor executing the control program,
  wherein the controller allows the display device to display at least one of a plurality of respective first images representing the plurality of functions in a predetermined first region of the display area and display, in a predetermined second region of the display area different from the first region, at least one of respective second images showing the plurality of combinations of setting values stored in the storage device, and
  upon acceptance of a touch gesture on one of the at least one second image through the touch panel, the controller executes, in accordance with the combination of setting values shown by the second image on which the touch gesture has been made, a job related to the function associated with the second image, wherein
  when accepting the touch gesture on the second image through the touch panel, the controller allows the display device to display a setting screen for use in configuring settings of the function associated with the second image on which the touch gesture has been made, in a state where the setting screen reflects the combination of setting values shown by the second image, and
  when accepting an instruction to execute a job through the operation device while the setting screen is displayed, the controller executes the job related to the function associated with the second image, in accordance with the combination of setting values shown by the second image.

2. An information processing apparatus comprising:
  a display device including a display area;
  an operation device that includes a touch panel provided on the display device and accepts an instruction from a user;
  a storage device that stores a plurality of respective combinations of setting values set in jobs previously executed in relation to each of a plurality of predetermined functions; and
  a control device that includes a processor and functions as a controller through the processor executing the control program,
  wherein the controller allows the display device to display at least one of a plurality of respective first images representing the plurality of functions in a predetermined first region of the display area and display, in a predetermined second region of the display area different from the first region, at least one of respective second images showing the plurality of combinations of setting values stored in the storage device, and
  upon acceptance of a touch gesture on one of the at least one second image through the touch panel, the controller executes, in accordance with the combination of setting values shown by the second image on which the touch gesture has been made, a job related to the function associated with the second image, wherein
  the storage device further stores a plurality of sizes of the second images, each size in association with one of sizes of the first images,
  the controller allows the display device to display the at least one first image in a predetermined first size in the first region and display, in the second region, the at least one second image in the size of the second images stored in the storage device in association with the first size, and
  upon acceptance of a specification instruction to specify as the size of the first images a second size different from the first size through the touch panel, the controller allows the display device to display the at least one first image in the specified second size in the first region and display, in the second region, the at least one second image in the size of the second images stored in the storage device in association with the second size.

3. The information processing apparatus according to claim 2, wherein
  the storage device further stores a plurality of values of number of the first images to be displayed in the first region and a plurality of values of number of the second images to be displayed in the second region, each value in association with one of the sizes of the first images,
  in allowing the display device to display the at least one first image in the first size, the controller allows the display device to display in the first region the at least one first image in accordance with the value of the number of the first images stored in the storage device in association with the first size and display in the second region the at least one second image in accordance with the value of the number of the second images stored in the storage device in association with the first size, and
  in allowing the display device to display the at least one first image in the second size, the controller allows the display device to display in the first region the at least one first image in accordance with the value of the number of the first images stored in the storage device in association with the specified second size and display in the second region the at least one second mage in accordance with the value of the number of the second images stored in the storage device in association with the specified second size.

4. The information processing apparatus according to claim 2, wherein
  the storage device previously stores a protected password,
  when the controller accepts a password entered through the touch panel and the entered password does not match the protected password stored in the storage device, the controller allows the display device to display in the second region, among the plurality of combinations of setting values stored in the storage device, only the at least one second image showing the combination of setting values without sensitive information, and when the controller accepts a password entered through the touch panel and the entered password matches the protected password, the controller allows the display device to display in the second region all the respective second images showing the plurality of combinations of setting values stored in the storage device.

5. The information processing apparatus according to claim 2, wherein the controller allows the display device to display as the at least one first image an icon containing a character string indicating the function associated with the at least one first image in the first region and display as the at least one second image a button containing a character string indicating the combination of setting values associated with the at least one second image in the second region, and upon acceptance of an instruction to specify a character size of the character string contained in the icon through the touch panel, the controller allows the display device to display the character string indicating the function in the specified character size in the first region and also display the character string indicating the combination of setting values in the specified character size in the second region.

6. The information processing apparatus according to claim 2, wherein the controller allows the display device to display as the at least one first image an icon containing a character string indicating the function associated with the at least one first image in the first region and display as the at least one second image a button containing a character string indicating the combination of setting values associated with the at least one second image in the second region, and upon acceptance of the specification instruction through the touch panel, the controller changes the at least one first image to a form without the character string indicating the function, allows the display device to display the at least one first image in the changed form, changes the at least one second image to a form without a portion of the character string showing the combination of setting values, and allows the display device to display the at least one second image in the changed from.

7. An information processing apparatus comprising:
a display device including a display area;
an operation device that includes a touch panel provided on the display device and accepts an instruction from a user;
a storage device that stores a plurality of respective combinations of setting values set in jobs previously executed in relation to each of a plurality of predetermined functions; and
a control device that includes a processor and functions as a controller through the processor executing the control program,
wherein the controller allows the display device to display at least one of a plurality of respective first images representing the plurality of functions in a predetermined first region of the display area and display, in a predetermined second region of the display area different from the first region, at least one of respective second images showing the plurality of combinations of setting values stored in the storage device, and upon acceptance of a touch gesture on one of the at least one second image through the touch panel, the controller executes, in accordance with the combination of setting values shown by the second image on which the touch gesture has been made, a job related to the function associated with the second image, wherein the controller allows the display device to display, among the plurality of first images, a predetermined number of first images in the first region, the controller allows the display device to display the first region and the second region at a predetermined size ratio, and when accepting an instruction to specify a size ratio different from the predetermined size ratio as the size ratio between the first region and the second region through the touch panel, the controller allows the display device to display the first region and the second region at the specified different size ratio.

8. The information processing apparatus according to claim 7, wherein the storage device further stores a plurality of values of number of the second images to be displayed in the second region and a plurality of arrangements of the second images to be displayed in the second region, each in association with one of the size ratios, in allowing the display device to display the first region and the second region at the predetermined size ratio, the controller allows the display device to display, in the second region, the second images in accordance with the value of the number of the second images and the arrangement of the second images, both stored in the storage device in association with the predetermined size ratio, and in allowing the display device to display the first region and the second region at the different size ratio, the controller allows the display device to display, in the second region, the second images in accordance with the value of the number of the second images and the arrangement of the second images, both stored in the storage device in association with the different size ratio.

9. The information processing apparatus according to claim 7, wherein when a proportion of the first region represented by the different size ratio is equal to or more than a predetermined lower limit, the controller allows the display device to display the first region and the second region at the different size ratio, when the proportion of the first region is less than the lower limit, the controller keeps the display device from displaying the first region and the second region at the different size ratio.

10. The information processing apparatus according to claim 7, wherein when accepting a first gesture manipulation on the first region and a second gesture manipulation on the second region through the touch panel, the controller acquires the specified size ratio by acquiring as a proportion of the first region in the specified size ratio a figure described by the first gesture manipulation and acquiring as a proportion of the second region in the specified size ratio a figure described by the second gesture manipulation.

11. The information processing apparatus according to claim 7, wherein
in allowing the display device to display the first region and the second region at the predetermined size ratio, the controller allows the display device to display the second region in a predetermined location,
when accepting through the touch panel a location specifying instruction to specify as a location of the second region a location different from the predetermined location, the controller allows the display device to display the second region in the specified different location.

12. The information processing apparatus according to claim 7, wherein after elapse of a predetermined time since the first region and the second region have been displayed at the different size ratio, the controller allows the display device to display the first region and the second region at the predetermined size ratio.

13. The information processing apparatus according to claim 10, wherein when the figure described by the first gesture manipulation is "0", the controller allows the display device to display the second region without displaying the first region.

* * * * *